(12) United States Patent
Murade

(10) Patent No.: US 7,903,186 B2
(45) Date of Patent: Mar. 8, 2011

(54) ELECTRO-OPTICAL DEVICE, METHOD OF MANUFACTURING ELECTRO-OPTICAL DEVICE, AND ELECTRONIC APPARATUS

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 691 days.

(21) Appl. No.: 11/327,323

(22) Filed: Jan. 9, 2006

(65) Prior Publication Data

US 2006/0181500 A1    Aug. 17, 2006

(30) Foreign Application Priority Data

Feb. 17, 2005  (JP) .................................. 2005-040113
Sep. 30, 2005  (JP) .................................. 2005-286393

(51) Int. Cl.
G02F 1/1333  (2006.01)
G02F 1/1343  (2006.01)
G09G 3/36   (2006.01)

(52) U.S. Cl. ........... 349/40; 349/122; 349/139; 349/140; 345/100

(58) Field of Classification Search .................... 349/40, 349/122, 139, 140; 345/100
See application file for complete search history.

(56) References Cited

U.S. PATENT DOCUMENTS

| | | | |
|---|---|---|---|
| 5,448,384 A | 9/1995 | Uchino et al. | |
| 5,563,624 A | 10/1996 | Imamura | |
| 5,650,834 A * | 7/1997 | Nakagawa et al. | 349/139 |
| 5,852,480 A * | 12/1998 | Yajima et al. | 349/40 |
| 5,903,260 A | 5/1999 | Imamura | |
| 6,421,038 B1 * | 7/2002 | Lee | 345/98 |
| 6,876,341 B2 | 4/2005 | Ide et al. | |
| 6,914,643 B1 | 7/2005 | Nagase et al. | |
| 7,002,542 B2 | 2/2006 | Lee | |
| RE39,236 E | 8/2006 | Imamura | |
| 7,109,965 B1 * | 9/2006 | Lee et al. | 345/98 |
| 7,151,518 B2 | 12/2006 | Fukumoto et al. | |
| 7,199,777 B2 | 4/2007 | Moon | |
| 7,335,953 B2 | 2/2008 | Matsueda et al. | |
| 7,342,617 B2 | 3/2008 | Tanaka et al. | |
| 2002/0118322 A1 * | 8/2002 | Murade | 349/110 |
| 2004/0057173 A1 * | 3/2004 | Takikawa et al. | 361/56 |
| 2005/0122440 A1 * | 6/2005 | Hamilton | 349/14 |
| 2005/0168197 A1 * | 8/2005 | Baeumel et al. | 323/220 |
| 2006/0001640 A1 | 1/2006 | Lee | |
| 2007/0171170 A1 | 7/2007 | Moon | |

FOREIGN PATENT DOCUMENTS

| | | |
|---|---|---|
| JP | A 07-225387 | 8/1995 |
| JP | A-07-294952 | 11/1995 |
| JP | A 11-121631 | 4/1999 |
| JP | A 2000-155554 | 6/2000 |
| JP | A-2000-187247 | 7/2000 |
| JP | B2-3173200 | 3/2001 |
| JP | A-2001-142096 | 5/2001 |

(Continued)

*Primary Examiner* — Mark A Robinson
*Assistant Examiner* — Jerry Blevins
(74) *Attorney, Agent, or Firm* — Oliff & Berridge PLC

(57) ABSTRACT

An electro-optical device includes, on a substrate, a plurality of pixel portions arranged in a pixel region; a peripheral circuit which is placed in a peripheral region located at a periphery of the pixel region, and controls the plurality of pixel portions; image signal lines that supply image signals; and ground potential lines that supply ground potentials to the peripheral circuit. The image signal lines are electrically connected to the ground potential lines via discharge resistors made of a film having a higher resistance than a conductive film constituting the image signal lines and the ground potential lines.

17 Claims, 12 Drawing Sheets

FOREIGN PATENT DOCUMENTS

| | | |
|---|---|---|
| JP | B2-3240829 | 10/2001 |
| JP | A-2003-149668 | 5/2003 |
| JP | A-2003-322874 | 11/2003 |
| JP | A-2004-152901 | 5/2004 |
| JP | A 2004-287003 | 10/2004 |
| KR | 2000-0022668 A | 4/2000 |
| KR | 2003-0023477 | 3/2003 |
| KR | 2004-0026009 | 3/2004 |

* cited by examiner

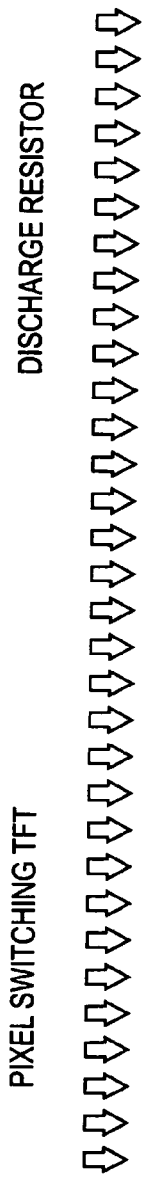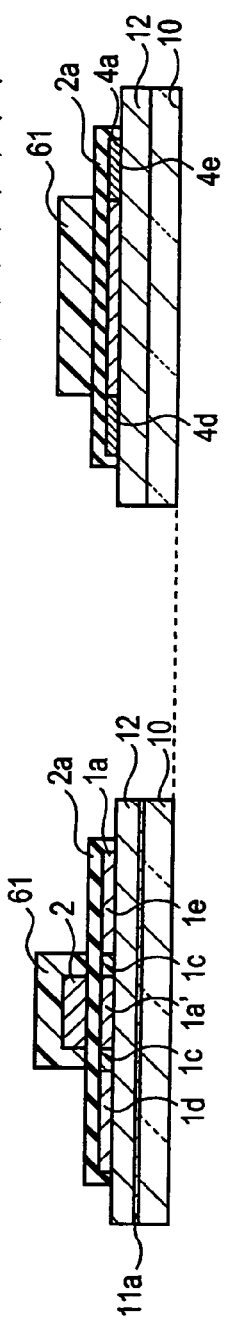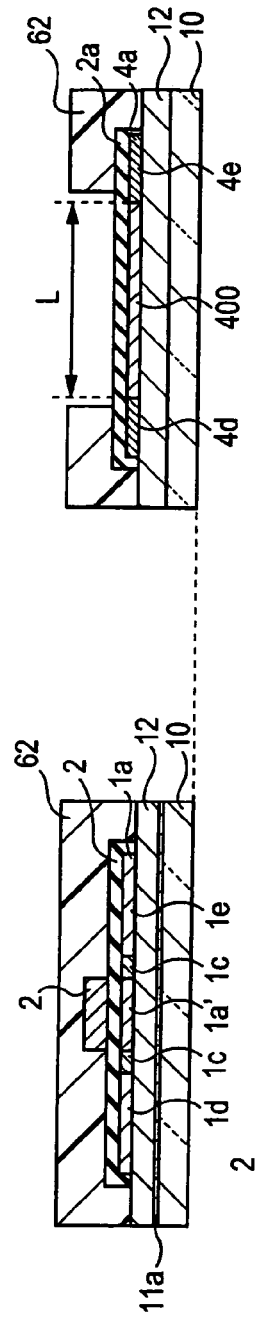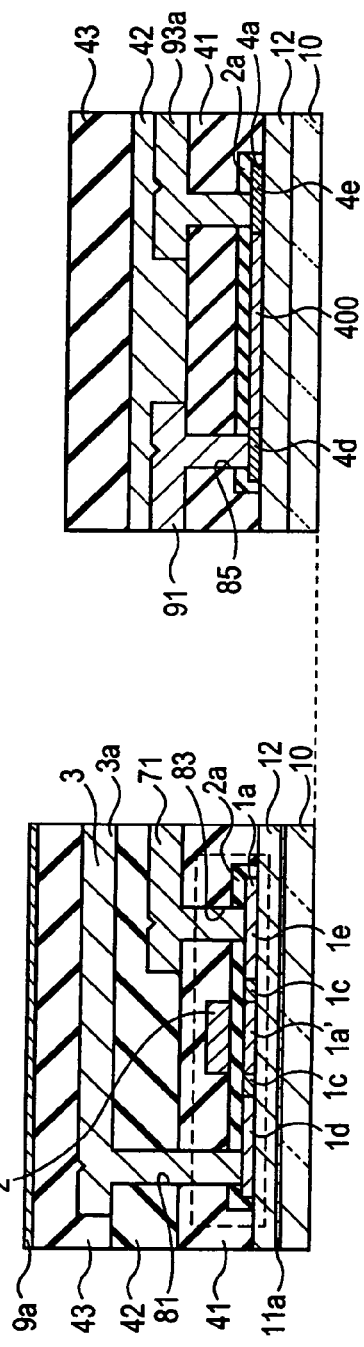
FIG. 8A  FIG. 8B  FIG. 8C

ELECTRO-OPTICAL DEVICE, METHOD OF MANUFACTURING ELECTRO-OPTICAL DEVICE, AND ELECTRONIC APPARATUS

BACKGROUND

1. Technical Field

The present invention relates to an electro-optical device such as a liquid crystal device, to a method of manufacturing the same, and to an electronic apparatus equipped with the electro-optical device such as a liquid crystal projector.

2. Related Art

In this type of electro-optical device, electro-optical material such as liquid crystal, etc., is inserted between a pair of substrates. A plurality of pixel electrodes are provided on an element substrate which is one of the substrates. Also, counter electrodes facing the plurality of pixel electrodes are provided on a counter substrate, which is the other one of the substrates. Moreover, peripheral circuits such as a data line driving circuit, and a scanning line driving circuit, which drive pixel electrodes etc., are provided on the element substrate, and a plurality of wiring lines are led from a plurality of external circuit connection terminals to the peripheral circuit. The electro-optical device thus constituted is set, at the time of completion or delivery thereof, to an inspection device to which a power signal, a test image signal, etc., are supplied, and then its operation is inspected or adjusted.

After the inspection or adjustment of its operation is complete and the electro-optical device is removed from the inspection device, electrical charges based on various signals remain on the peripheral circuit or the wiring lines of the electro-optical device. In particular, if electrical charges by the image signals or the counter electrode potential remain on the image signal lines or the counter electrode potential lines, a DC voltage is applied between a pixel electrode and a counter electrode, and thus the liquid crystal, etc., located between both electrodes are burned in. Alternatively, if the electrical charges remain as described above, it is difficult to perform an inspection or adjustment again afterwards with a high precision.

Based on this contemplation, Japanese Patent No. 3173200 proposes a technology that connects, outside the electro-optical device, external circuit connection terminals connected to image signal lines and external circuit connection terminals connected to counter electrode potential lines respectively via resistors or short-circuit switches. Also, Japanese Patent No. 3240829 proposes a technology that connects, inside the electro-optical device, the entire wiring lines to ground potential lines, etc., via internal resistor lines that are formed of a semiconductor layer constituting pixel switching thin film transistors (hereinafter, referred to as "TFTs"). Either of the technologies enables the removal of the residual charges in the electro-optical device as described above.

However, according to the technology disclosed in Japanese Patent No. 3173200, the terminals to which the image signal lines are connected are connected to the terminals to which the ground potential lines are connected in a terminal-to-terminal manner. Accordingly, resistors or short-circuit switches for connection purpose are required to be provided outside the electro-optical device. Moreover, in fabricating the resistors or short-circuit switches for connection purpose by using the technology, it is difficult to secure an area for fabricating such resistors or short-circuit switches in the limited area on the substrate. In particular, in case of a small-sized electro-optical device or an electro-optical device having a large image display region in view of the substrate, it is extremely difficult to secure such area. Moreover, if the discharge resistors are fabricated in a small area at a region on the substrate, in other words, small-sized discharge resistors are fabricated, the possibility that the small-sized discharge resistors are destroyed by an electrostatic breakdown due to static electricity becomes higher. In particular, when other wiring lines are placed on an upper or lower layer of the small-sized discharge resistors via an interlayer insulating film, a capacitor structure is constructed via the interlayer insulating film, and thus the possibility that the discharge resistors at this portion are destroyed by an electrostatic breakdown becomes extremely high. In sum, fabricating resistors or short-circuit switches inside the electro-optical device as disclosed in Japanese Patent No. 3240829 makes the substrate or the overall device larger, or alternatively, makes the device deteriorated due to static electricity, and thus substantially disadvantageous in practice.

On the other hand, according to the technology disclosed in Japanese Patent No. 3240829, the discharge resistors are formed of the film used for thin transistors, and thus the degree of design freedom is excessively low. Therefore, fabricating the discharge resistors having appropriate high resistances in the limited area on the substrate, or fabricating the discharge resistors having appropriate high resistances in a small area, is difficult or, practically impossible. In other words, from the relation of the performance, etc., that is required for the pixel switching thin film transistors, if the same film is used both for the pixel switching thin film transistors and for the discharge resistors, restriction on the resistance value, area, and location of the resistors that can be fabricated becomes excessively significant. Additionally, even with this technology, as with the technology of Japanese Patent No. 3173200, using small-sized discharge resistors would increase the possibility of an electrostatic breakdown.

SUMMARY

An advantage of some aspects of the invention is that it provide an electro-optical device and the manufacturing method thereof, and an electronic apparatus equipped with such electro-optical device, which can effectively prevent the electrical charges from remaining on the image signal lines or the counter electrode potential lines.

An electro-optical device according to an aspect of the invention includes, on a substrate, a plurality of pixel portions arranged in a pixel region; a peripheral circuit which is placed in a peripheral region located at a periphery of the pixel region, and controls the plurality of pixel portions; image signal line that supplies image signals; ground potential line that supplies ground potential to the peripheral circuit; and a discharge resistor electrically connecting the image signal line and the ground potential line. The discharge resistor is made of a film having a higher resistance than a conductive film constituting the image signal line and the ground potential line.

In the operation of the liquid crystal device of the aspect, from an external circuit through the external circuit connection terminals, various signals for operating the data line driving circuit as a part of the peripheral circuit such as clock signals, power signals, control signals, and the image signals, are supplied to the data line driving circuit. Further, from the external circuit through the external circuit connection terminals, various signals for operating the scanning line driving circuit as a part of the peripheral circuit such as clock signals, power signals, and the control signals are supplied to the scanning line driving circuit. At this time, a ground potential is supplied to the peripheral circuit via the ground potential line, and the image signals are supplied to the peripheral circuit via the image signal lines. On the other hand, via the counter electrode potential line, and also via vertical conductive terminals and vertical conduction materials, the counter electrode potential is supplied to the counter electrode. Thus, for example, an active matrix driving is accomplished by supplying the image signals to the pixel region or each of pixel portions arranged in the pixel array region via the data lines by the data line driving circuit, supplying the scanning signals to each of the pixel portions via the scanning lines by the scanning line driving circuit, and driving the electro-optical material such as liquid crystal inserted between the pixel electrodes and the counter electrodes at each pixel portion. Here, the "pixel region" refers to a region where a plurality of pixel portions are arranged on the substrate in plan view, in other words, the region for displaying an image by driving the plurality of pixel portions. For example, the "image display region" according to the embodiment of the invention is a typical example. Also, the scanning lines and the data lines described above are multi-layered so as to intersect each other, on the substrate. Furthermore, the pixel portions described above includes, for example, the pixel electrodes, and the pixel switching TFTs, whose gates are connected to the scanning lines, selectively supplying the image signals supplied from the data lines to the pixel electrodes in response to the scanning signals supplied from the scanning lines.

In the aspect, in particular, the image signal lines are electrically connected to the ground potential lines via the discharge resistors which are of high resistances. Accordingly, even if the liquid crystal device is set to an inspection device at the time of, for example, completion or delivery of it and then removed from the inspection device after its operation is inspected or adjusted, the charges remaining on the image signal lines of the liquid crystal device, or the charges remaining on the various electronic elements, etc., in the peripheral circuit connected to the image signal lines are discharged to the ground potential line via the discharge resistors in a brief period of time from the inspection or the adjustment to the removal. Here, how much time is needed to discharge depends on the resistance values of the discharge resistors. Accordingly, the discharge resistors are formed to have the resistances of 0.1 MΩ to 5 MΩ to allow discharge in a practically preferable period of time.

Accordingly, the electro-optical material such as the liquid crystal layer interposed between the pixel electrodes and the counter electrodes is effectively prevented from generating burning-in caused by the application of DC voltage between both electrodes by the residual charges when, for example, it is removed from an inspection device. Moreover, since there are no residual charges, an inspection or adjustment performed again afterwards can be accomplished with a high precision. At this time, resistors or short circuit switches for connection purpose as in Japanese Patent No. 3173200 are not needed outside the liquid crystal device. Nonetheless, since the discharge resistors are not formed of the film used for TFTs in the pixel portions, as in Japanese Patent No. 3240829, the degree of design freedom is high. Accordingly, it is possible to fabricate discharge resistors with suitable high resistances in the limited area on the substrate, or to fabricate discharge resistors with suitable high resistances in the small area. In other words, if the same film is not used, from the relation of the performance, etc., that is required for the TFTs of pixel portions such as pixel switching TFTs, the values, area, or location of the resistors that can be fabricated is not restricted.

As described above, according to the aspect of the invention, it is possible to effectively prevent the charges from remaining on the image signal lines.

In an aspect of the electro-optical device of the invention, the pixel portions have pixel electrodes. The device further includes counter electrodes opposing the pixel electrodes, and counter electrode potential lines that supply counter electrode potentials to the counter electrodes.

According to an aspect of the electro-optical device of the invention, the pixel portions have pixel electrodes. The counter electrodes opposing the pixel electrodes are supplied with the counter electrode potentials via the counter electrode potential lines. By electrically connecting the counter electrode potential lines to the ground potential lines via the discharge resistors according to the aspect of the invention, it is possible to effectively prevent the charges from remaining on the counter electrode potential lines.

In another aspect of the electro-optical device of the invention, the counter electrode potential lines are electrically connected to the ground potential lines via discharge resistors made of a film having a higher resistance than the conductive film constituting the counter electrode potential lines and the ground potential lines.

According to the aspect of the invention, the counter electrode potential lines are electrically connected to the ground potential lines via the discharge resistors made of a film having a higher resistance than the conductive film constituting the counter electrode potential line and the ground potential line. Therefore, compared with a case when the external circuit connection terminals or the front ends of wiring lines connected thereto are connected to the ground potential lines, a higher degree of freedom is achieved for the area or location where the discharge resistors can be formed, and thus a higher degree of freedom is achieved for the resistance values that can be realized. Moreover, various circuits such as an electrostatic protection circuit or an input protection circuit can be fabricated between the portion where the counter electrode potential line is connected to the discharge resistors and the external circuit connection terminals.

In another aspect of the electro-optical device of the invention, in the image signal lines and/or the counter electrode potential line, one end of each of the lines is electrically connected to each of external circuit connection terminals placed at the peripheral region; and the other end of each of the lines is electrically connected to each of the ground potential lines via the discharge resistors.

According to the aspect of the invention, in the image signal lines and/or the counter electrode potential line, the other end electrically connected to the external circuit connection terminal is electrically connected to each of the ground potential line via each of the discharge resistors. Therefore, since the discharge resistors are not provided in the middle of the wiring lines such as the image signal lines and the counter electrode potential lines, it is possible to effectively prevent the charges from remaining on at least one of the image signal lines and the counter electrode potential line, while securing design freedom of other wiring lines or circuits.

In another aspect of the electro-optical device of the invention, in the image signal lines and/or the counter electrode potential line, one end of each of the lines is electrically connected to an external circuit connection terminal placed at the peripheral region. An electrostatic protection circuit and/or an input protection circuit is provided in the middle of the at least one wiring line. Finally, the at least one wiring line is electrically connected to the ground potential line via each of the discharge resistors in the at least one protection circuit.

According to the aspect of the invention, since a protection circuit such as an electrostatic protection circuit or an input protection circuit, etc., exists between the portion where at least one of the image signal lines and the counter electrode potential line is connected to the discharge resistors and the external circuit connection terminals, even when small-sized discharge resistors are fabricated, the possibility that such small-sized discharge resistors are destroyed by the electrostatic breakdown due to the existence of static electricity becomes dramatically low. Fabricating the discharge resistors as described above prevents the device from being deteriorated by the electrostatic breakdown without making the substrate or the overall device large, and thus is especially advantageous in practice.

In another aspect of the electro-optical device of the invention, in the image signal lines and/or the counter electrode potential line, one end of each of the lines is electrically connected to each of external circuit connection terminals placed at the peripheral region. An electrostatic protection circuit and/or an input protection circuit is provided in the middle of the at least one wiring line. Finally, the at least one wiring line is electrically connected to the ground potential line via the discharge resistors, on the farther side than the at least one protection circuit from the external circuit connection terminals.

According to the aspect of the invention, since a protection circuit such as an electrostatic protection circuit or an input protection circuit exists between the portion where at least one lines of the image signal lines and the counter electrode potential lines are connected to the discharge resistors and the external circuit connection terminals, even when small-sized discharge resistors are fabricated, the possibility that such small-sized discharge resistors are destroyed by the electrostatic breakdown due to the existence of static electricity becomes remarkably low. Fabricating the discharge resistors as described above prevents the device from being deteriorated by the electrostatic breakdown without making the substrate or the overall device large, and thus is especially advantageous in practice.

In another aspect of the electro-optical device of the invention, the counter electrode potential line and the image signal lines are electrically connected to the identical ground potential lines via the discharge resistors.

According to the aspect of the invention, since the counter electrode potential line and the image signal lines are connected to the identical ground potential line, the potential difference between both wiring lines via the discharge resistors can be easily made to almost zero. In other words, the time required to make the potential difference between both wiring lines via the discharge resistors almost zero can be reduced.

In another aspect of the electro-optical device of the invention, the discharge resistors are made of a semiconductor film, and an impurity material different from an impurity material doped on a semiconductor film constituting semiconductor elements constituting at least a part of the pixel portions or the peripheral circuit is doped on a semiconductor film constituting the discharge resistors.

According to the aspect of the invention, rather than forming the discharge resistors with the film used for the TFTs in the pixel portions as in Japanese Patent No. 3240829 mentioned above, the discharge resistors are made of a semiconductor film, and an impurity material different from the impurity material doped on the semiconductor film of the pixel portions or the peripheral circuit is doped on the semiconductor film constituting the discharge resistors. In other words, by performing exclusive impurity doping, the discharge resistors have different resistance values from the semiconductor film constituting the semiconductor elements. For example, the discharge resistors have 0.1 MΩ to 5 MΩ so that the resistors are discharged in a practically preferable time. In particular, since the discharge resistors are formed by performing an exclusive impurity doping to the semiconductor film, the concentration or the type of the impurity material, or the area or the location of the discharge resistors can be set regardless of the semiconductor elements constituting the pixel portions or the peripheral circuit. Therefore, it is especially easy to secure an area for fabricating the discharge resistors in the limited area on the substrate. In particular, even in case of a small-sized electro-optical device or the type of electro-optical devices in which the image display region is large in view of the substrate, it is easy to secure such area. As a result, the discharge resistors having desired resistance values can be formed on a desired location with a desired area.

The semiconductor film constituting semiconductor elements and the semiconductor film constituting discharge resistors may be formed and patterned by the same process, and impurities are doped therein by separate processes. Alternatively, these semiconductor films may be formed and patterned by separate processes, and impurities are doped therein by separate processes.

In another aspect of the electro-optical device of the invention, the wiring lines led on the substrate include a wiring line portion passing the upper layer or the lower layer of the discharge resistors via an interlayer insulating film.

According to the aspect of the invention, since the wiring line led on the substrate includes the wiring line portion passing the upper layer or the lower layer of the discharge resistors, the plan region on the substrate where the discharge resistors are fabricated is not needed to be assigned exclusively for the discharge resistors. Thus, a different wiring line or peripheral circuit portion other than the discharge resistors can be placed on the upper layer or lower layer of the discharge resistors. In particular, if the electrostatic protection circuit is provided at a predetermined location as in the second embodiment, then, even though a condenser structure is constructed via the interlayer insulating film, the possibility that the discharge resistors are destroyed by the electrostatic breakdown at this portion can be lowered.

In another aspect of the electro-optical device of the invention, the image signal lines are made of a plurality of image signal lines to which a plurality of serial-to-parallel expanded image signals are supplied. Each of the plurality of image signal lines is electrically connected to each of the ground potential lines respectively via each of the plurality of discharge resistors. The length and the width of each of the plurality of discharge resistors are fallen within a predetermined range. Finally, the wiring line portion overlaps the entire plurality of discharge resistors.

According to the aspect of the invention, the length and the width (in other words, resistor length and resistor width) of each of the plurality of discharge resistors are arranged within a predetermined range, and preferably, the resistor length and the resistor width are arranged to the same design value. The wiring line portion overlaps the entire plurality of discharge resistors, and preferably, overlaps the entire plurality of discharge resistors equally. Accordingly, in response to what degree the length and the width of each of the resistors are arranged, or in response to what degree the discharge resistors are overlapped equally, the amount of charges discharged from each of the plurality of image signal lines approaches to each other, or preferably is equal to each other. In other words, the potentials of the image signal lines after the discharging approach to each other, or preferably are equal to each other, and the irregularities of the residual charges in each of the image signals can be reduced. Accordingly, the electro-optical material such as liquid crystal inserted between the pixel electrodes and the counter electrodes is effectively prevented from generating burning-in with irregularities unevenness by the application of DC voltage between both electrodes that has an unevenness triggered by an unevenness in the residual charges when, for example, it is removed from an inspection device. Therefore, it is possible to effectively prevent display irregularities generated in each of the image signals.

Moreover, because of the lack of the unevenness in the residual charges, an inspection or adjustment performed again afterwards can be performed with a higher precision. More specifically, in performing an inspection, the practically grave problem that, due to a variation in the residual charges, the determination whether the peripheral circuit or pixel portion is normal or abnormal cannot be made with a high precision can be effectively avoided by the aspect.

In another aspect of the electro-optical device of the invention, the discharge resistors are made of an impurity-doped semiconductor film, and a portion made of the semiconductor film that is doped by a heavier impurity than that of the discharge resistors are locally formed at the connecting portion of the discharge resistors and at least one of the image signal lines and the counter electrode potential line.

According to the aspect of the invention, the discharge resistors consist of an impurity-doped semiconductor layer. Here, in particular, since portions made of a semiconductor film that is doped by a heavier impurity than that of the discharge resistors is locally formed in the connecting portions of the discharge resistors, a semiconductor film portion having an excessively high resistance that is not doped with an impurity material exists at the connecting portion. Therefore, the loss of conductivity between the image signal lines or the counter electrode potential line and the discharge resistors is effectively prevented. In case of actually performing the impurity doping, since such a semiconductor film portion with an excessively high resistance might be generated from, for example, a dimensional error of a mask or a pattern error, preparing locations of low resistances at connecting portions by deliberately impurity-doping with a high concentration, as in the present embodiment, is especially advantageous in practice.

A manufacturing method of the electro-optical device (including the various aspects) of the invention includes forming a pixel portion, a peripheral circuit, external circuit connection terminals, wiring lines, and discharge resistors, on a substrate; forming counter electrodes on a counter substrate; and bonding the substrate and the counter substrate to each other. The forming of the pixel portion, etc. includes doping a first semiconductor film constituting semiconductor elements that constitute at least a part of the pixel portions or the peripheral circuit by using an impurity with a first concentration, and doping a second semiconductor film constituting the discharge resistors by using an impurity with a second concentration, which is performed separately from the doping of the first semiconductor film.

According to the manufacturing method of the liquid crystal device of the present embodiment, the pixel portions, the peripheral circuit the external circuit connection terminals, the wiring lines, and the discharge resistors, etc., are formed on the substrate by the forming of a pixel region, etc., that has various treatments including the film-forming treatment, patterning treatment, impurity-doping treatment, high temperature treatment, etc. On the other hand, the counter electrodes, etc., are formed on the counter substrate by the forming of the counter electrodes that has various treatments including the film-forming treatment, patterning treatment, impurity-doping treatment, high temperature treatment, etc. Thereafter, the substrate and the counter substrate are bonded together by the bonding process so that the electro-optical material such as liquid crystal is finally sandwiched between them. Here, in particular, in the forming of a pixel region, etc., that forms substrate, the impurity-doping is performed by the first doping process with the first concentration to the first semiconductor film constituting the semiconductor elements forming a part of the pixel portions or the peripheral circuit. Before or after this process, the impurity-doping with the second concentration is performed to the second semiconductor film constituting the discharge resistors by the exclusive second doping process for forming the discharge resistors, separate from the first doping process. Therefore, the discharge resistors are not formed of the film used for the TFTs in the pixel portions as in the above-mentioned Japanese Patent No. 3240829. Since the discharge resistors are formed by performing an exclusive impurity doping to the semiconductor film, the concentration or the type of the impurity material, or the area or the location of the discharge resistors can be set regardless of the semiconductor elements constituting the pixel portions or the peripheral circuit. Accordingly, as in the electro-optical device according to the invention described above, the discharge resistors can be easily formed to have different resistor values from the semiconductor film constituting the pixel switching TFTs.

As described above, according to the aspect of the invention, a liquid crystal device that especially effectively prevents the charges from remaining on the image signal lines or the counter electrode potential line can be manufactured relatively easily.

In one aspect of the manufacturing method of the electro-optical device of the invention, in the forming of a pixel region, etc., the first and the second semiconductor films are formed and patterned by the same process before the doping of the first semiconductor film and the doping of the second semiconductor film.

According to the aspect of the invention, since the first semiconductor film and the second semiconductor film are formed and patterned by the same process, the manufacturing process may be simplified. These semiconductor films may also be formed and patterned in separate processes each other, and then, an exclusive impurity doping may be performed to the semiconductor film constituting the discharge resistors.

In another aspect of the manufacturing method of the electro-optical device of the invention, in the forming of a pixel region, etc., during the forming of the first semiconductor film, the second semiconductor film is covered by a first resist for preventing from being doped by the impurity with the first concentration.

According to the aspect of the invention, since the second semiconductor film is covered by the first resist while the first doping process is performed, the concentration or the type of the impurity material, or the area or the location of the second semiconductor film constituting the discharge resistors can be set regardless of the first semiconductor film constituting the semiconductor elements.

According to the aspect of the invention, the doping of the second semiconductor film is performed so as to dope the impurity with the second concentration by using a second resist in which a wider area than the area covered by the first resist is exposed so that a portion made of the semiconductor film that is doped by a heavier impurity than that of the discharge resistors are locally formed at the connecting portion of the discharge resistors and at least one of the image signal lines and the counter electrode potential lines.

By manufacturing as described above, the portions made of the semiconductor layer that is more heavily impurity-doped than the discharge resistors can be locally formed at the connecting portions of the discharge resistors. Accordingly, the loss of conductivity between the image signal lines or the counter electrode potential line and the discharge resistors caused by the existence of semiconductor film portions, at the connecting portions, having an excessively high resistance without impurity doping is effectively prevented. In case of performing the impurity doping, since such a semiconductor film portion with an excessively high resistance might be generated from, for example, a dimensional error of a mask or a pattern error, preparing locations of low resistances at connecting portions by using the first resist and the second resist whose patterns are delicately misaligned each other as described above, is especially advantageous in practice.

In another aspect of the manufacturing method of the electro-optical device of the invention, the wiring lines include a wiring line portion passing the upper layer or the lower layer of the discharge resistors via an interlayer insulating layer on the substrate, the image signal lines has a plurality of image signal lines to which a plurality of serial-to-parallel expanded image signals are supplied, each of the plurality of image signal lines is electrically connected to each of the ground potential lines via a single discharge resistor among the plurality of discharge resistors as a discharge resistor, and the length and the width of each of the plurality of discharge resistors are fallen in a predetermined range, and the wiring line portion overlaps the entire plurality of discharge resistors. Further, the doping of the second semiconductor film dopes the plurality of discharge resistors by the same process.

According to the aspect of the invention, since the plurality of discharge resistors are doped by the same process, i.e., by the doping of the second semiconductor film, the resistor length and the resistor width of each of the plurality of discharge resistors can be fallen to the same design value. Accordingly, the wiring line portion passing the upper layer or the lower layer of the discharge resistors via the interlayer insulating layer can relatively easily overlap the entire plurality of discharge resistors. The irregularities of the residual charges in each of the image signals can be reduced. Accordingly, the electro-optical material such as liquid crystal sandwiched between the pixel electrodes and the counter electrodes is effectively prevented from generating an image persistence with an unevenness by the application of DC voltage between both electrodes that has an unevenness triggered by an unevenness in the residual charges when, for example, it is removed from an inspection device. Therefore, it is possible to effectively prevent display irregularities generated in each of the image.

The electronic apparatus according to an aspect of the invention is equipped with the electro-optical device described above, and can realize various electronic apparatuses that can display a high quality images such as a television, a cellular phone, an electronic organizer, a word processor, a view finder type or a monitor direct view type video tape recorder, a workstation, a videophone, a POS terminal, a touch panel, or the like, or image forming devices using the electro-optical device as an exposing head such as a printer, a copier, a facsimile machine, or the like. Also, the electronic apparatus of the invention can also realize a field emission display such as an electronic paper, a conduction electron-emitter display, or the like.

The described advantages and other effects of the invention will be apparent from the following embodiments which will be described below.

BRIEF DESCRIPTION OF THE DRAWINGS

The invention will be described with reference to the accompanying drawings, wherein like numbers reference like elements.

FIG. 8 is a (second) manufacturing process diagram of the discharge resistors and the pixel switching TFTs.

DESCRIPTION OF EXEMPLARY EMBODIMENTS

First Embodiment

A first embodiment of the invention will now be described with reference to the FIGS. 1 to 11. The embodiment is that an electro-optical device of the invention is applied to a TFT active matrix-driving liquid crystal device with a built-in driving circuit.

First, the general structure of the electro-optical device according to the present embodiment will be described with reference to FIGS. 1 and 2. Here, FIG. 1 is a plan view showing the structure of the electro-optical device according to the present embodiment, and FIG. 2 is a cross-sectional view taken along the II-II line in FIG. 1.

Figure 1:
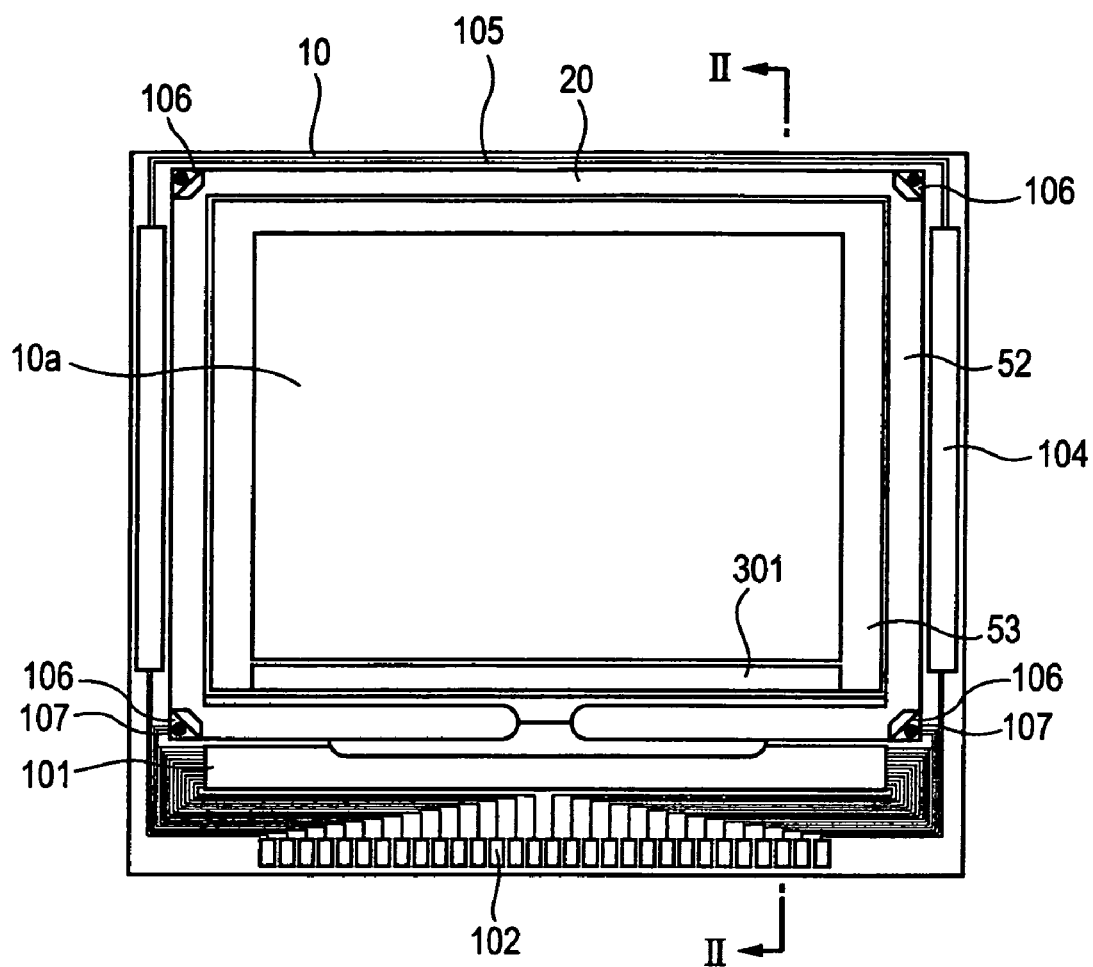
FIG. 1 is a plan view showing the overall structure of the liquid crystal device according to the first embodiment of the invention.
Figure 2:
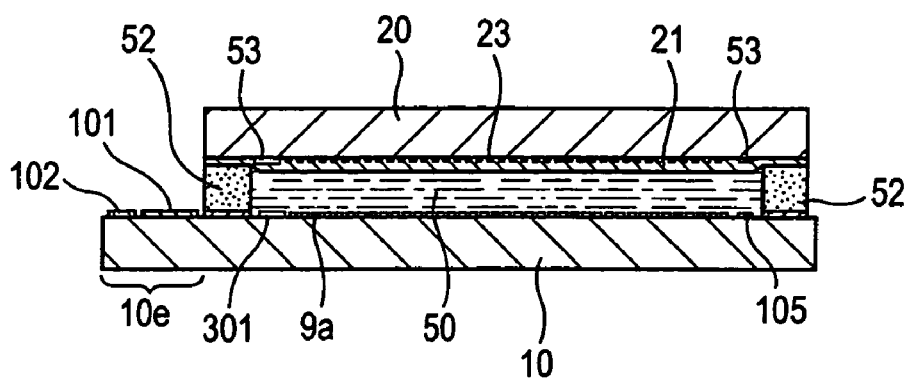
FIG. 2 is a cross-sectional view along the II-II line in FIG. 1.

In FIGS. 1 and 2, according to the electro-optical device of the present embodiment, a TFT array substrate 10 and a counter substrate 20 are placed facing each other. A liquid crystal layer 50 is sealed between the TFT array substrate 10 and the counter substrate 20. The TFT array substrate 10 and the counter substrate 20 are adhered to each other by a sealing material 52 provided in a sealing region located around an image display region 10a, which is an example of a "pixel region" of the invention.

In FIG. 1, a frame-like light shielding film 53 having light shielding property that defines the frame region of the image display region 10a is provided at the side of the counter substrate 20 parallel to the inside of the sealing region where the sealing material 52 is placed. In the region of a peripheral region outside the sealing region where the sealing material 52 is placed, a data line driving circuit 101 and external circuit connection terminals 102 are provided along one side of the TFT array substrate 10. A sampling circuit 301 is provided inside the sealing region along the one side and covered by the frame-like light shielding film 53. Also, scanning line driving circuits 104 are provided outside the sealing region along the two sides adjacent to the one side. Moreover, a plurality of wiring lines 105 are provided along the remaining one side of the TFT array substrate 10 in order to connect the two scanning line driving circuits 104 provided on both sides of the image display region 10a. Also, on the TFT array substrate 10, vertical conductive terminals 106 are placed in the regions opposing the four corners of the counter substrate 20 in order to connect both substrates with vertical conduction material 107. Thus, the TFT array substrate 10 and the counter substrate 20 can be electrically connected to each other.

In FIG. 2, on the TFT array substrate 10 is formed a layered structure in which a pixel switching TFT (Thin Film Transistor), which is a pixel switching element, scanning lines, data lines, etc., are fabricated. In the image display region 10a, pixel electrodes 9a are provided on the wiring lines such as the pixel switching TFTs, the scanning lines and the data lines. On the other hand, on the opposite surface of the counter substrate 20 to the TFT array substrate 10, a light shielding film 23 is formed. Also, on the light shielding film 23, counter electrodes 21 made of a transparent material such as ITO are formed opposing the plurality of pixel electrodes 9a.

Although not shown herein, on the TFT array substrate 10, in addition to the data line driving circuit 101 and the scanning line driving circuits 104, discharge resistors, an electrostatic protection circuit and so on are formed, which will be described below. In addition to this, an inspection circuit, patterns for inspection, or the like may be formed for inspecting, for example, the quality or defect of the liquid crystal device during the manufacturing or at the time of shipment.

Also, in case of a device where elements are formed on silicon substrates such as the LCOS or DMD, transistors may be formed instead of TFTs as the pixel switching elements.

Also, in case the liquid crystal is in the IPS mode, the counter electrodes 21 are formed on the TFT array substrate 10.

Next, the main structure of the liquid crystal device will be described with reference to FIG. 3. Here, FIG. 3 shows the structure of the essential parts of the liquid crystal device according to the present embodiment.

Figure 3:
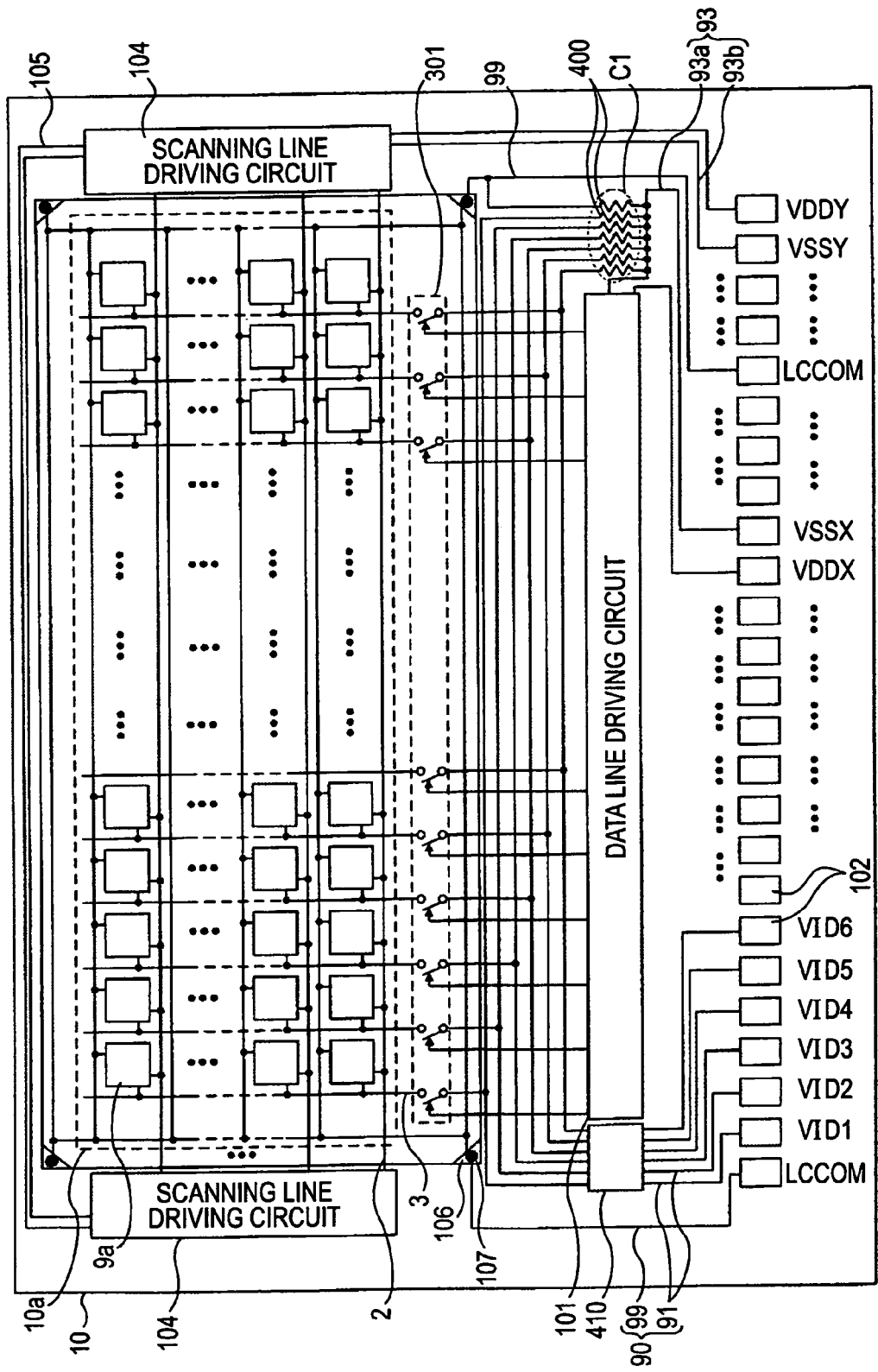
FIG. 3 is a plan view showing the essential parts of the liquid crystal device according to the first embodiment of the invention.

In FIG. 3, the TFT array substrate 10 and the counter substrate 20 (refer to FIG. 2) of the liquid crystal device are made of, for example, a quartz substrate, a glass substrate, silicon substrate, or the like, and are placed facing each other via a liquid crystal layer. The liquid crystal device is structured so that it controls the voltage applied to the pixel electrodes 9a that are demarcated and arranged in the image display region 10a and modulates the electric field applied to the liquid crystal layer 50 (refer to FIG. 2) for each of the pixels. Thus the amount of transmitted light between both substrates is controlled, and the image is gray-scale displayed. The liquid crystal device adopts the TFT active matrix-driving mode, and in the image display region 10a on the TFT array substrate 10, a plurality of pixel electrodes 9a placed in a matrix, and a plurality of scanning lines 2 and a plurality of data lines 3 which intersect each other, respectively, to construct a pixel portion that corresponds to a pixel. Also, although not shown herein, between each of the pixel electrodes 9a and a data line 3 are formed a TFT whose conduction or non-conduction is controlled in response to each of the scanning signals supplied via a scanning line 2, and a storage capacitance for maintaining the voltage applied to the pixel electrode 9a. Also, in the peripheral region of the pixel display region 10a, driving circuits such as the data line driving circuit 101, external circuit connection terminals 102, and the electrostatic protection circuit 401 are formed. Moreover, a plurality of routing wiring lines 90 including image signal lines 91 for supplying image signals VID1 to VID6 and ground potential lines 93 for supplying second power signals VSSX and VSSY, which are the ground potential powers, are led from the external circuit connection terminals 102 to the driving circuits such as the data line driving circuit 101. The wiring lines 90 are an example of the "wiring lines" according to the invention.

On the counter substrate 20 (refer to FIG. 2), the counter electrodes 21 are formed opposing the pixel electrodes 9a. The routing wiring lines 90 further include counter electrode potential lines 99 for supplying a counter electrode potential LCCOM to the counter electrodes 21. On the TFT array substrate 10, vertical conductive terminals 106 are also formed in order to electrically connect the counter electrode potential lines 99 and the counter electrodes 21 each other. Also, between the TFT array substrate 10 and the counter substrate 20 (refer to FIG. 2), a vertical conduction material 107 is provided to electrically connect the vertical conductive terminals 106 and the counter electrodes 21 each other.

The image signal lines 91 and the counter electrode potential lines 99 are electrically connected to the ground potential line 93a via discharge resistors 400 having higher resistances than the conduction film forming the image signal lines 91, the counter electrode potential lines 99, and the ground potential lines 93.

Next, the operation of the liquid crystal device according to the present embodiment constructed as above will be described with reference to FIG. 3.

In the operation of the liquid crystal device according to the present embodiment, various signals for operating the data line driving circuit 101 such as clock signals, a first power signal VDDX, the second power signal VSSX, control signals, and the image signals VID1 to VID6, are supplied to the data line driving circuit 101 from the external circuits connected to the external circuit connection terminals 102 via, for example, FPC, through the external circuit connection terminals 102 and the routing wiring lines 90. In parallel with this, various signals for operating the scanning line driving circuits 104, such as clock signals, a first power signal VDDY, a second power signal VSSY, and the control signals are supplied to the scanning line driving circuits 104 from the external circuits through the external circuit connection terminals 102 and the routing wiring lines 90. At this time, the second power signal VSSX, which is the ground potential, is supplied to the data line driving circuit 101 via the ground potential line 93a among the routing wiring lines 90, and the second power signal VSSY, which is the ground potential, is supplied to the scanning line driving circuits 104 via the ground potential line 93b. Also, the image signals VID1-VID6 are supplied to the sampling circuit 301 via the image signal lines 91 among the routing wiring lines 90. On the other hand, the counter electrode potential LCCOM is supplied to the counter electrode 21 (refer to FIG. 2) via the counter electrode potential lines 99 among the routing wiring lines 90, and also via the vertical conductive terminals 106 and the vertical conduction material 107. Thus, an active matrix driving is accomplished by supplying the pixel portion with the image signals VID1-VID6 via the data lines 3 by the data line driving circuit 101, supplying the pixel portion with the scanning signals via the scanning lines 2 by the scanning line driving circuits 104, and driving the liquid crystal layer 50 sandwiched between the pixel electrodes 9a and the counter electrodes 21 at each pixel portion. Also, the scanning lines 2 and the data lines 3 are multi-layered so as to intersect each other, on the TFT array substrate 10. Furthermore, although not shown herein, pixel switching TFTs together with the pixel electrodes 9a are formed in the pixel portion. The gate of each of the pixel switching TFTs is connected to each of the scanning lines 2, and each of the pixel switching TFTs selectively supplies the image signals VID1 to VID6 supplied from each of the data lines 3 to each of the pixel electrodes 9a in response to the scanning signal supplied from each of the scanning lines 2.

In the present embodiment, in particular, the image signal lines 91 and the counter electrode potential lines 99 are electrically connected to the ground potential line 93a via the discharge resistors 400 which are of high resistances. Accordingly, even if the liquid crystal device is set to an inspection device at the time of, for example, completion or delivery of it and then removed from the inspection device after its operation is inspected or adjusted, the charges remaining on the image signal lines 91 and the counter electrode potential lines 99 of the liquid crystal device, or the charges remaining on the various electronic elements and so on in the peripheral circuit such as the data line driving circuit 101 and the scanning line driving circuits 104 connected to the image signal lines 91 or the counter electrode potential lines 99, are discharged to the ground potential line 93a via the discharge resistors 400 in a brief period of time from the inspection or the adjustment to the removal. Here, in the present embodiment, the discharge resistors are formed to have the resistances of 0.1 MΩ-5 MΩ, and thus allow discharge in a practically preferable period of time.

Accordingly, the liquid crystal layer 50 sandwiched between the pixel electrode 9a and the counter electrode 21 (refer to FIG. 2) is effectively prevented from generating an image persistence by the application of DC voltage between both electrodes by the residual charges when, for example, it is removed from an inspection device. Moreover, since there are no residual charges, an inspection or adjustment performed again afterwards can be accomplished with a high precision. At this time, resistors or short circuit switches for connection purpose, as in Japanese Patent No. 3173200, are not needed outside the liquid crystal device. Nonetheless, since the discharge resistors are not formed of the film used for TFTs in the pixel portion, the degree of design freedom is high. Accordingly, discharge resistors with suitable high resistances can be fabricated in the limited area on the TFT array substrate 10.

As described above, according to the present embodiment, the charges can be prevented from remaining on the image signal lines 91 and the counter electrode potential lines 99 in a remarkably effective manner.

In FIG. 3, according to the present embodiment, in particular, each of the rear ends of the wiring lines of the image signal lines 91 and the counter electrode potential lines 99 located opposite to the front ends connected to the external circuit connection terminals 102 are electrically connected to the ground potential line 93a via the discharge resistors 400, respectively.

Accordingly, compared with a case when the external circuit connection terminals 102 or the front ends of wiring lines connected thereto are connected to the ground potential line, a higher degree of freedom is achieved for the area or location where the discharge resistors can be formed, and thus a higher degree of freedom is achieved for the resistance values that can be realized. Moreover, various circuits such as an electrostatic protection circuit 410 or an input protection circuit can be fabricated between the portion where the image signal lines 91 and the counter electrode potential lines 99 are connected to the discharge resistors 400 and the external circuit connection terminals 102.

The image signal lines 91 and the counter electrode potential lines 99 may be electrically connected to the ground potential line 93a via the discharge resistors 400 in the middle of the wiring lines with a similar effect as described above.

Additionally, in the present embodiment, on the TFT array substrate 10, an electrostatic protection circuit 410 is additionally formed, which is placed in the middle of the routing wiring lines 90. Various types of conventional electrostatic protection circuit may be adopted to the specific structure of the electrostatic circuit 410, for example, in a type that the routing wiring lines 90 are connected to the power wiring lines and so on via diode-connected TFTs or diodes. The image signal lines 91 and the counter electrode potential lines 99 are electrically connected to the ground potential line, respectively, via the discharge resistors 400 at the far side from the electrostatic protection circuit 410 when viewed from the external circuit connection terminals 102. Also, they may be electrically connected to the ground potential line via the discharge resistors 400 within the electrostatic protection circuit 410.

According to the present embodiment, since the electrostatic protection circuit 410 exists between the portion where the image signal lines 91 and the counter electrode potential lines 99 are connected to the discharge resistors 400 and the external circuit connection terminals 102, even when small-sized discharge resistors 400 are fabricated, the possibility that such small-sized discharge resistors are destroyed by the electrostatic breakdown becomes dramatically low. Fabricating the discharge resistors 400 as described above prevents the device from being deteriorated by the electrostatic breakdown without making the substrate or overall device large, and thus is especially advantageous in practice.

Moreover, in the present embodiment, the counter electrode potential lines 99 and the image signal lines 91 are electrically connected to the identical ground potential line 93a each other via the discharge resistors 400. Therefore, it becomes easy to make the potential difference between both wiring lines via the discharge resistors 400 almost zero. In other words, the time required to make the potential difference between both wiring lines via the discharge resistors 400 almost zero is reduced.

Figure 4:
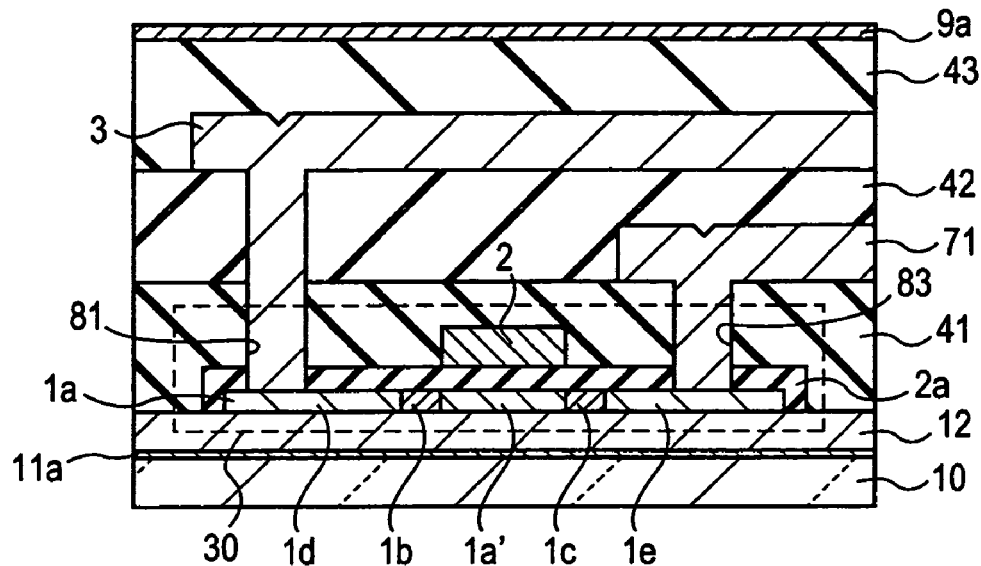
FIG. 4 is a cross-sectional view in an arbitrary pixel switching TFT.
Figure 5:
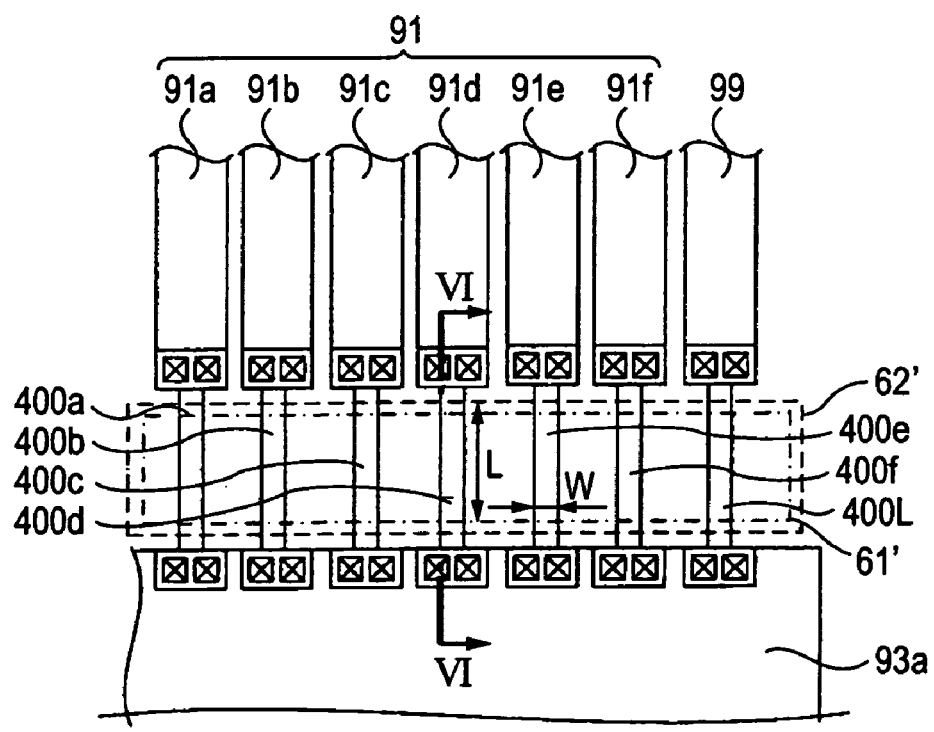
FIG. 5 is an enlarged partial plan view of C1 in FIG. 3.
Figure 6:
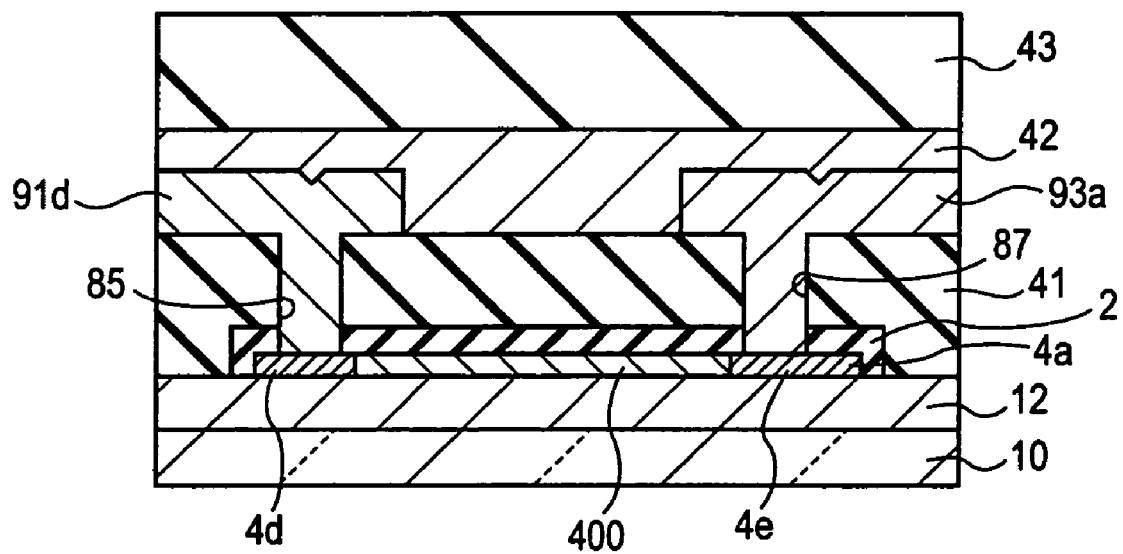
FIG. 6 is a cross-sectional view along the VI-VI line in FIG. 5.

Next, the structure of the pixel switching TFTs and the discharge resistors in the present embodiment will be described with reference to FIGS. 4 to 6. Here, FIG. 4 is a cross-sectional view showing a cross section along a channel region in an arbitrary pixel switching TFT. FIG. 5 is an enlarged partial plan view of the C1 portion in FIG. 3. FIG. 6 is a cross-sectional view along the VI-VI line in FIG. 5.

In FIG. 4, the pixel switching TFT 30 has an LDD (Lightly Doped Drain) structure, and is equipped with a scanning line 2, a channel region 1a' of the semiconductor layer 1a where a channel is formed by the electric field from the scanning line, an insulating film 2a including a gate insulating film that insulates the scanning line 2 and the semiconductor layer 1a, a lightly doped source region 1b and a lightly doped drain region 1c of the semiconductor layer 1a, and a heavily doped source region 1d and a heavily doped drain region 1e of the semiconductor layer 1a.

On the scanning line 2 is formed a first interlayer insulating film 41, where a contact hole 81 communicating with the heavily doped source region 1d and a contact hole 83 communicating with the heavily doped drain region 1e are opened, respectively.

On the first interlayer insulating film 41 is formed a lower capacity electrode 71 of a storage capacitor, which is electrically connected to the heavily doped drain region 1e via the contact hole 83. A second interlayer insulating film 42 is formed, where the contact hole 81 is formed therein.

On the second interlayer insulating film 42 is formed a data line 3, which is electrically connected to the heavily doped source region 1d via the contact hole 81. A third interlayer insulating film 43 and a pixel electrode 9a are formed on them in that order.

On the other hand, under the TFT 30, a lower light shielding film 11a is formed via a base insulating film 12. The lower light shielding film 11a is provided in order to shield the channel region 1a' of the TFT 30 and its periphery from the return light introduced from the TFT array substrate 10 into the device.

In FIG. 5, the image signal lines 91 consist of a plurality of image signal lines 91a to 91f to which a plurality of serial-to-parallel expanded image signals VID1 to VID6 are supplied. Each of the plurality of image signal lines 91a to 91f is electrically connected to the ground potential line 93a via a single discharge resistor corresponding thereto among the plurality of discharge resistors 400a to 400f as discharge resistors 400.

In FIG. 6, a discharge resistor 400 consists of an impurity-doped semiconductor layer 4a via the base insulating film 12 on the TFT array substrate 10. Moreover, at the connecting portions of the discharge resistor 400 and the image signal lines 91 and the counter electrode potential lines 99 are formed heavily impurity-doped portions 4d and 4e that locally exist, which are formed of the semiconductor layer 4a that is more heavily impurity-doped than the discharge resistor 400. On the discharge resistor 400 is formed the first interlayer insulating film 41, where the contact holes 85 and 87 communicating with the heavily impurity-doped portions 4d and 4e, respectively, are opened.

On the first interlayer insulating film 41 are formed the image signal line 91d and the ground potential line 93a. The image signal line 91d is electrically connected to the heavily impurity-doped portion 4d via the contact hole 85, and the ground potential line 93a is electrically connected to the heavily impurity-doped portion 4e via the contact hole 87. The second interlayer insulating film 42 and the third interlayer insulating film 43 are formed on them in that order.

According to the structure as described above, the loss of conductivity between the image signal line 91 or the counter electrode potential line 99 and the discharge resistor 400 caused by the existence of semiconductor film portions, at the connecting portions, having an excessively high resistance without impurity doping is effectively prevented. In case of actually performing the impurity doping, since such a semiconductor film portion with an excessively high resistance might be generated from, for example, a dimensional error of a mask or a pattern error, preparing locations of low resistances at connecting portions by deliberately impurity-doping with a high concentration, as in the present embodiment, is especially advantageous in practice.

In the present embodiment, the discharge resistor 400 is connected to the ground potential line 93a for data line driving circuit. The discharge resistor 400, however, may be connected to the ground potential line 93b for scanning line driving circuit.

By performing an exclusive impurity doping on the semiconductor film 4a constituting the discharge resistor 400, separate from the impurity doping performed on the semiconductor film constituting the pixel switching TFT, the semiconductor film 4a has a different resistance value from that of the semiconductor film constituting the semiconductor elements.

Next, the manufacturing process of the discharge resistors according to the present embodiment will be described with reference to FIGS. 7 and 8. Here, FIGS. 7 and 8 are the process diagrams for fabricating the discharge resistors and the pixel switching TFTs.

Figure 7A:
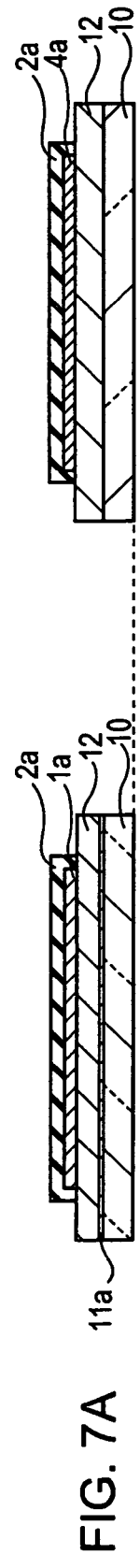
FIG. 7 is a (first) manufacturing process diagram of the discharge resistors and the pixel switching TFTs.

First, in the process of FIG. 7A, a TFT array substrate 10 such as a silicon substrate, a quartz substrate, or a glass substrate, is prepared. Here, the substrate 10 is heat-treated in an inert gas atmosphere, preferably in N2 (Nitrogen) or the like, and at approximately 850-1300° C., more preferably at a high temperature of 1000° C., and pre-processed so that the distortion occurred on the substrate 10 in the high temperature processes performed thereafter will be reduced.

Subsequently, a light shielding layer is formed on the entire surface of the TFT array substrate 10 thus processed, by, for example, a sputtering method, using metal such as Ti, Cr, W, Ta, Mo, and Pd or metal alloy such as metal silicide, with a thickness of 100-500 nm, preferably about 200 nm. Thereafter, a lower light shielding film 11a having a predetermined pattern that will be formed under the pixel switching TFTs is formed by, for example, a photolithography method or etching.

Subsequently, on the lower light shielding film 11a, the base insulating film 12 made of a silicate glass film such as NSG (non-silicate glass), or PSG, BSG or BPSG made by doping phosphorous (P) or boron (B), a silicon nitride film, or a silicon oxide film is formed with, for example, an atmospheric pressure or reduced-pressure CVD method which uses a TEOS (Tetra Ethyl Ortho Silicate) gas, a TEB (Tetra Ethyl Borate) gas, a TMOP (Tetra Methyl Oxy Phorate) or the like.

Subsequently, on the base insulating film 12, a poly-silicon film is grown in solid phase by forming an amorphous silicon film and thermally treating it by a reduced pressure CVD method or the like. Alternatively, without involving any amorphous silicon film, the poly-silicon film may be directly formed by a reduced pressure CVD method or the like. Next, by performing a photolithography method, an etching process, or the like, on the poly-silicon film, the first semiconductor film 1a and the second semiconductor film 4a having a predetermined pattern are formed. Moreover, by performing a thermal oxidation or the like, the insulating film 2a that will become the gate insulating film is formed. As a result, the thickness of each of the first semiconductor film 1a and the second semiconductor film 4a is about 30-150 nm, preferably about 35-50 nm, and the thickness of the insulating film 2a is about 20-150 nm, preferably about 30-100 nm.

Figure 7B:
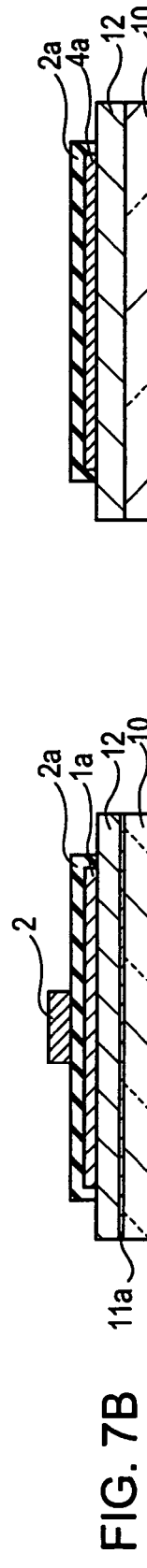

Next, in the process of FIG. 7B, subsequently, a poly-silicon film is deposited on the pixel switching TFT portion with a thickness of about 100-500 nm by, for example, a reduced pressure CVD or the like, and the poly-silicon film is made conductive by thermally diffusing phosphorous (P), and a scanning line 2 having a predetermined pattern is formed by a photo-lithography method or an etching.

Figure 7C:
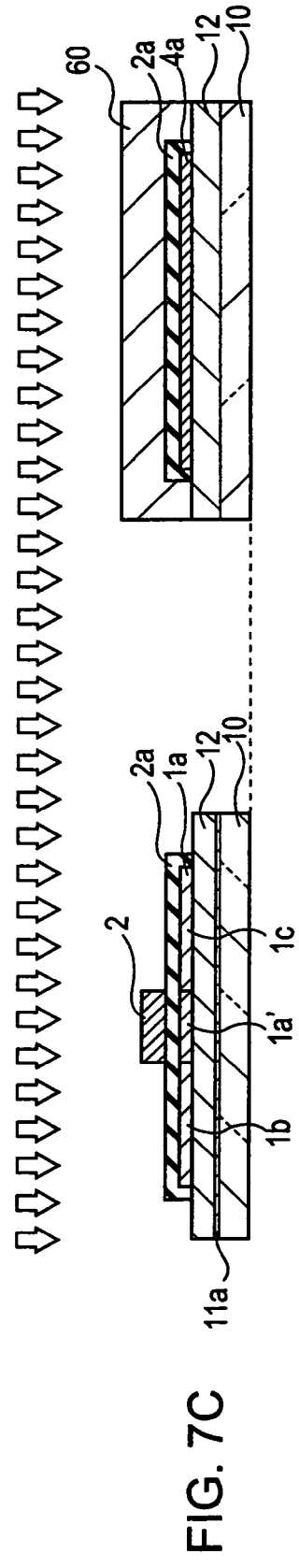

Next, in the process of FIG. 7C, subsequently, by doping impurity ions in a low concentration, the semiconductor layer 1a having a lightly doped source region 1b and a lightly doped drain region 1c is formed at the pixel switching TFT portion. On the other hand, the discharge resistor portion is covered by the resist 60 to prevent it from being impurity-doped.

Next, in the process of FIG. 8A, subsequently, by doping impurity ions in a high concentration, the semiconductor film 1a of the pixel switching TFT 30 having an LDD structure is formed at the pixel switching TFT portion including the lightly doped source region 1b and the lightly doped drain region 1c. On the other hand, the semiconductor film 4a is formed including the heavily doped region 4d and 4e by covering the discharge resistor portion with a resist 61 having a predetermined pattern.

Next, in the process of FIG. 8B, subsequently, the entire pixel switching TFT portion is covered by the resist 62. The heavily doped region 4d and 4e in the discharge resistor portions are covered by the resist 62. A discharge resistor 400 is formed by doping impurity ions with a predetermined concentration.

Next, in the process of FIG. 8C, subsequently, a lower capacity electrode 71 and data lines 3 are formed at the pixel switching TFT portion. On the other hand, at the discharge resistor portion, an image signal line 91 and a ground potential line 93a are formed. First, contact holes 83, 85, 87 are opened in the first interlayer insulating film 41 by, for example, a dry etching method, wet etching method or combination thereof. Subsequently, a lower capacity electrode 71, an image signal line 91, and a ground potential line 93a are formed by, for example, depositing a poly-silicon film by a reduced pressure CVD method or the like, and further, thermally diffusing phosphorous (P) to make the poly-silicon film conductive. Then, a relatively thin dielectric film with a thickness of about 50 nm, made of a high temperature silicon oxide film (HTO film) or silicon nitride film is deposited on the lower capacity electrode 71 by, for example, a reduced pressure CVD method, a plasma CVD method, or the like. And then, metal such as Ti, Cr, W, Ta, Mo, or Pd, or metal alloy such as metal silicide are sputtered to form an upper capacity electrode. Thus, the storage capacitance is formed. Subsequently, the contact hole 81 is opened in the second interlayer insulating layer 42. Then, the conductive film 3a is deposited to form the data lines 3. The third interlayer insulating film 43 and the pixel electrode 9a are formed on it.

According to the present embodiment, the discharge resistors 400 are not formed of the film used for the TFTs in the pixel portion as in the above-mentioned Japanese Patent No. 3240829. The discharge resistors 400 have different resistance values from the semiconductor film constituting the pixel switching TFTs by performing an exclusive impurity doping (refer to FIG. 8B) on the semiconductor film constituting the discharge resistors 400, separate from the impurity doping performed on the semiconductor film of the pixel portion such as the pixel switching TFTs 30 or the peripheral circuit. In the present embodiment, the discharge resistors have 0.1 MΩ-5 MΩ so that the resistors are discharged in a practically preferable time. In particular, since the discharge resistors 400 are formed by performing an exclusive impurity doping (refer to FIG. 8B) to the semiconductor film, the concentration or the type of the impurity material, or the area or the location of the discharge resistors 400 can be set regardless of the semiconductor elements constituting the pixel portion such as the pixel switching TFTs 30 or the peripheral circuit. Therefore, it is especially easy to secure an area for fabricating the discharge resistors 400 in the limited area on the TFT array substrate 10. In particular, even in case of a small-sized liquid crystal device or when the image display region 10a is large in view of the TFT array substrate, it is easy to secure such area. As a result, the discharge resistors 400 having desired resistance values can be formed on a desired location with a desired area.

As described above, according to the present embodiment, the charges can be prevented from remaining on the image signal lines 91 and the counter electrode potential lines 99 in a remarkably effective manner.

The semiconductor film constituting the semiconductor elements and the semiconductor film constituting discharge resistors may be formed and patterned in the same opportunity, and impurity doped in separate opportunities. Alternatively, these semiconductor films may be formed and patterned in separate opportunities, and impurity doped in separate opportunities.

Modifications

Figure 9:
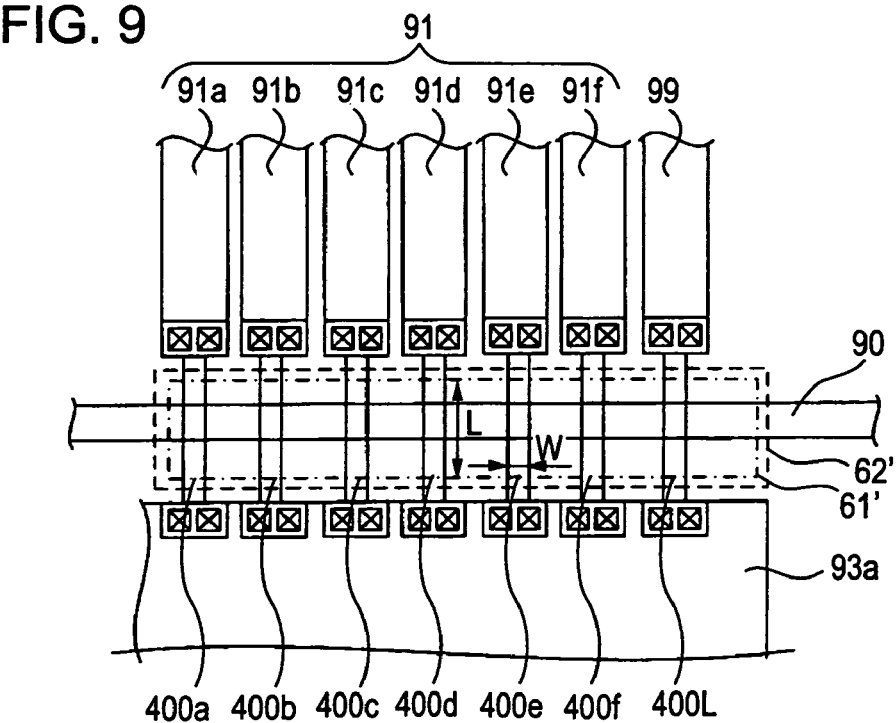
FIG. 9 is a drawing having the same gist as FIG. 5 according to the modification of the first embodiment.
Figure 10:
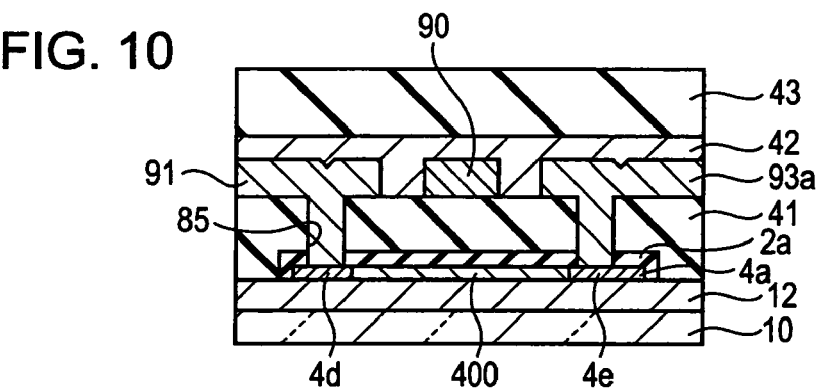
FIG. 10 is a drawing having the same gist as FIG. 6 according to the first modification.
Figure 11:
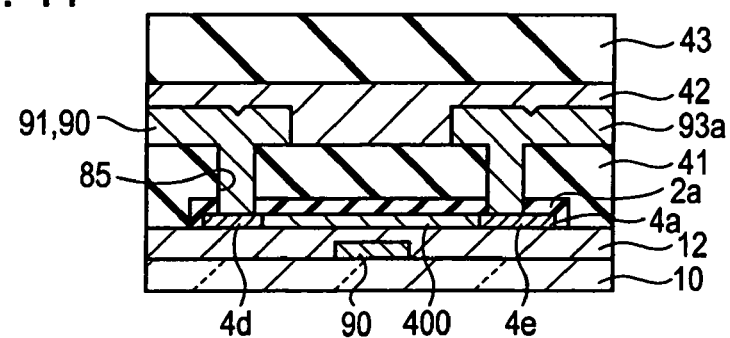
FIG. 11 is a drawing having the same gist as FIG. 6 according to the second modification.

Next, referring to FIGS. 9 to 11, a modification according to the present embodiment will be described. Here, FIG. 9 is a drawing having the same gist as FIG. 5 according to the first modification of the present embodiment. FIG. 10 is a cross-sectional view having the same gist as FIG. 6 according to the first modification. FIG. 11 is a cross-sectional view having the same gist as FIG. 6 according to the second modification.

As shown in FIGS. 9 and 10 as the first modification, the routing wiring line 90 may include a wiring line portion passing the upper layer of the discharge resistors 400 via the interlayer insulating film on the TFT array substrate 10. In such a structure, at least in the area where the routing wiring line 90 overlaps the discharge resistors 400, the routing wiring line 90 is formed on the same level as the image signal lines 91.

Also, as shown in FIG. 11 as the second modification, the routing wiring line 90 may include a wiring line portion passing the lower layer of the discharge resistors 400 via the interlayer insulating film on the TFT array substrate 10. In such a structure, at least in the area where the routing wiring line 90 overlaps the discharge resistors 400, the routing wiring line 90 is formed on the same level as the lower light shielding film 11a of the pixel switching TFT (on the layer between the TFT array substrate 10 and the base insulating film 12).

As described above, since the routing wiring line 90 includes the wiring line portion passing the upper layer or the lower layer of the discharge resistors 400, the planar region on the TFT array substrate 10 where the discharge resistors 400 are fabricated is not needed to be assigned exclusively for the discharge resistors 400. Thus, a separate routing wiring line 90 or peripheral circuit portion other than the discharge resistors 400 can be placed on the upper layer or lower layer of the discharge resistors 400. In particular, if the electrostatic protection circuit 410 (refer to FIG. 3) is provided at a predetermined location as in the present embodiment, then, even though a condenser structure is constructed via the interlayer insulating film, the possibility that the discharge resistors 400 are destroyed by the electrostatic breakdown at this portion can be lowered.

Moreover, the image signal lines 91 consist of a plurality of image signal lines 91a to 91f to which a plurality of serial-to-parallel expanded image signals VID1 to VID6 are supplied. Each of the plurality of image signal lines 91a to 91f is electrically connected to the ground potential line 93a via a single discharge resistor corresponding thereto among the plurality of discharge resistors 400a to 400f as discharge resistors 400. The length L and the width W of each of the plurality of discharge resistors 400a to 400f are arranged within a predetermined range, and the wiring line portion of the routing wiring line 90 overlaps the entire plurality of discharge resistors 400a to 400f.

According to the structure as described above, the length L and the width W of each of the plurality of discharge resistors 400a to 400f are arranged within a predetermined range, and preferably, the length L and the width W are arranged to the same design value. Accordingly, the resistor value of each of the discharge resistors 400a to 400f can be arranged within a predetermined range (preferably to the same value). The wiring line portion of the routing wiring line 90 overlaps the entire plurality of discharge resistors 400a to 400f, and preferably, overlaps the entire plurality of discharge resistors 400a to 400f equally. Accordingly, in response to what degree the length L and the width W of each of the resistors are arranged, or in response to what degree the discharge resistors are overlapped equally, the amount of charges discharged from each of the plurality of image signal lines 91a to 91f converges each other, or preferably is equalized. In other words, the potential of each of the image signal lines 91a to 91f after the discharge converges each other, or preferably is equalized, and irregularities of the residual charges in each of the image signals VID1 to VID6 is reduced. Accordingly, the liquid crystal layer 50 (refer to FIG. 2) sandwiched between the pixel electrode 9a and the counter electrode 21 is effectively prevented from generating an image persistence with an unevenness by the application of DC voltage between both electrodes that has an unevenness triggered by an unevenness in the residual charges when, for example, it is removed from an inspection device. Therefore, it is possible to effectively prevent display irregularities generated in each of the image signals VID1 to VID6.

Moreover, because of the lack of the unevenness in the residual charges, an inspection or adjustment performed again afterwards can be performed with a higher precision. More specifically, in performing an inspection, the practically grave problem that, due to a variation in the residual charges, the determination whether the peripheral circuit or pixel portion is normal or abnormal cannot be made with a high precision can be effectively avoided.

It is enough to set the above-mentioned predetermined range to the one by which irregularities generated in each of image signals VID1 to VID6 would not adversely affect the residual charges. More specifically, it is enough to set, based on experiments, experience, or simulations, while taking the manufacturing error into account, the range of the resistor length L and the resistor width W of each of the plurality of discharge resistors 400a to 400f that do not generate an unevenness in the residual charges as the predetermined scope. Also, for simplicity, it is enough to set the resistor length L and the resistor width W of each of the plurality of discharge resistors 400a to 400f to an identical value, and design the wiring line portion to be equally overlapped with the entire plurality of discharge resistors 400a to 400f. More preferably, forming the plurality of discharge resistors 400a to 400f in the same opportunity would make the manufacturing process easier, and also, would make the arrangement of the resistance values easier.

Second Embodiment

Figure 12:
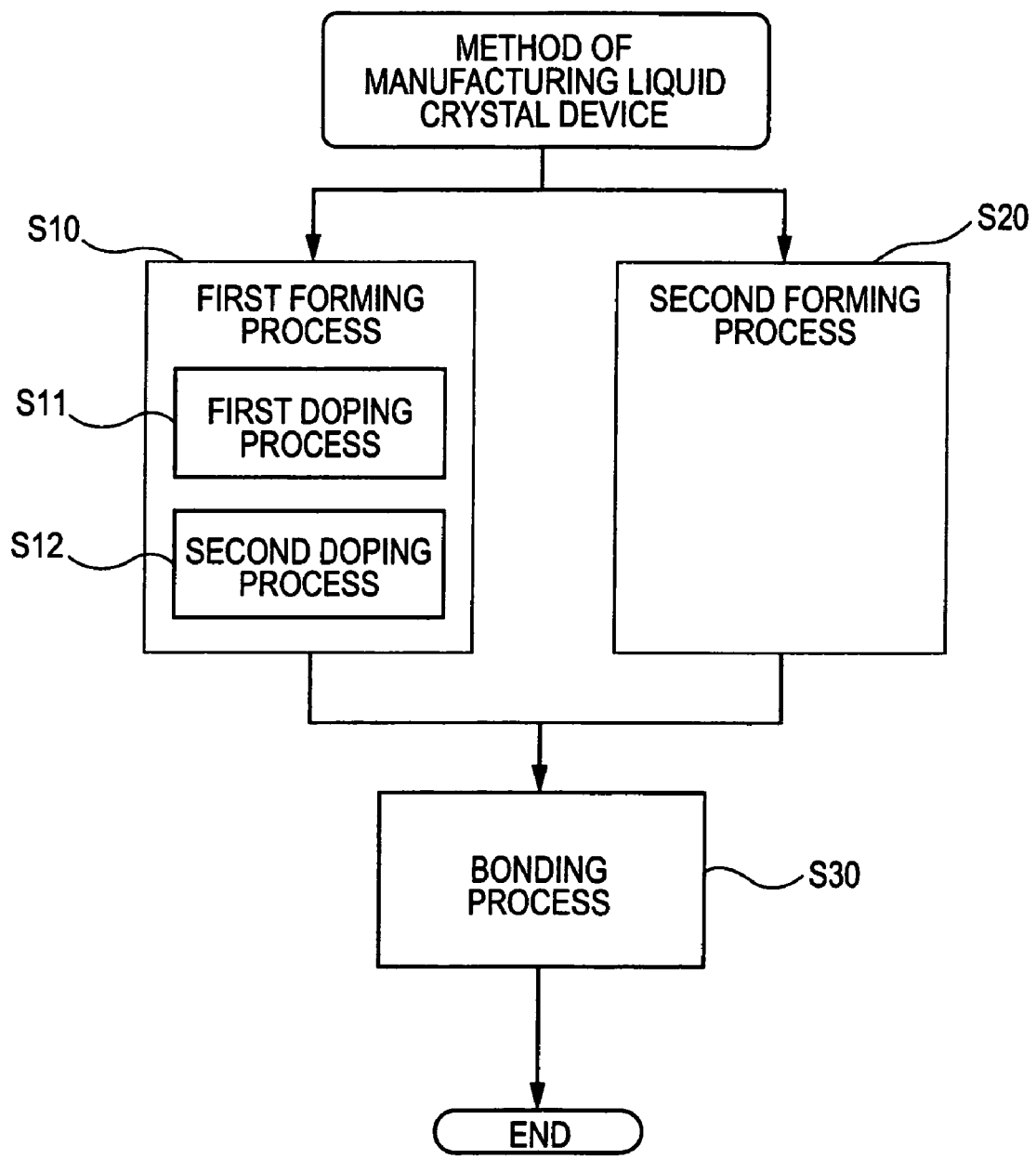
FIG. 12 is a flow chart showing the manufacturing method of the liquid crystal device according to the first embodiment.

Next, the manufacturing method of the liquid crystal device according to the second embodiment will be described with reference to FIGS. 3, 7, 8 and 12. FIG. 12 is a flow chart showing the manufacturing method of the liquid crystal device according to the present embodiment.

In FIG. 12, the manufacturing method of the liquid crystal device according to the present embodiment includes the first forming process (S10) that forms the pixel portion 9a, the peripheral circuit having the data line driving circuit 101 and the scanning line driving circuits 104, the external circuit connection terminals 102, the routing wiring lines 90 and the discharge resistors 400 on the TFT array substrate 10, the second forming process (S20) that forms the counter electrodes 21 on the counter substrate 20, and the bonding process (S30) that bonds the TFT array substrate 10 and the counter substrate 20 each other.

The first forming process (S10) includes the first doping process (S11) that impurity-dopes, with a first concentration, the first semiconductor film 1a (refer to FIG. 7C) that constitutes the semiconductor elements forming at least a part of the pixel portion 9a or the peripheral circuit including the data line driving circuit 101, the scanning line driving circuits 104, etc., as shown in FIG. 3. The first forming process (S10) further includes the second doping process (S12), separate from the first doping process, that impurity-dopes, with a second concentration, the second semiconductor film 4a (refer to FIG. 8B) constituting the discharge resistors 400.

According to the manufacturing method of the liquid crystal device in the present embodiment, the pixel portion 9a, the peripheral circuit including the data line driving circuit 101, the scanning line driving circuits 104, etc., the external circuit connection terminals 102, the routing wiring lines 90, and the discharge resistors 400, etc., are formed on the TFT array substrate 10 by the first forming process that has various treatments including the film-forming treatment, patterning treatment, impurity-doping treatment, high temperature treatment, etc.

On the other hand, the counter electrode 21, etc., are formed on the counter substrate 20 by the second forming process (S20) that has various treatments including the film-forming treatment, the patterning treatment, impurity-doping treatment, high temperature treatment, etc. Thereafter, the TFT array substrate 10 and the counter substrate 20 are bonded together by the bonding process so that the liquid crystal layer 50 (refer to FIG. 7C) is finally interposed between them.

Here, in particular, in the first forming process (S10) that forms the TFT array substrate 10, the impurity-doping is performed by the first doping process (S11) with the first concentration to the first semiconductor film 1a constituting the semiconductor elements forming a part of the pixel portion 9a or the peripheral circuit including the data line driving circuit 101, the scanning line driving circuits 104, etc (refer to FIG. 8B).

Before or after this process, the impurity-doping with the second concentration is performed (refer to FIG. 8B) to the second semiconductor film 4a constituting the discharge resistors 400 by the exclusive second doping process (S20) for forming the discharge resistors 400, separate from the first doping process (S10).

Therefore, according to the second embodiment, the discharge resistors are not formed of the film used for the TFTs in the pixel portion as in the above-mentioned Japanese Patent No. 3240829. Since the discharge resistors 400 are formed by performing an exclusive impurity doping to the semiconductor film, the concentration or the type of the impurity material, or the area or the location of the discharge resistors 400 can be set regardless of the semiconductor elements constituting the pixel portion or the peripheral circuit including the data line driving circuit 101 and the scanning line driving circuits 104. Accordingly, as in the liquid crystal device according to the first embodiment, the discharge resistors 400 can be easily formed to have different resistor values from the semiconductor film constituting the pixel switching TFTs 30.

As described above, according to the present embodiment, a liquid crystal device that especially effectively prevents the charges from remaining on the image signal lines 91 or the counter electrode potential lines 99 can be manufactured relatively easily.

In the manufacturing method of the liquid crystal device according to the present embodiment, in the first forming process (S10) in particular, the first semiconductor film 1a and the second semiconductor film 4a are formed or patterned together at a same time before the first doping process (S11) and the second doping process (S12).

Accordingly, since the first semiconductor film 1a and the second semiconductor film 4a are formed and patterned at a same time, the manufacturing process may be simplified. These semiconductor films may also be formed and patterned in separate opportunities each other, and then, an exclusive impurity doping may be performed to the semiconductor film constituting the discharge resistors.

In the manufacturing method of the liquid crystal device according to the present embodiment, in the first forming process (S10) in particular, the second semiconductor film 4a is covered by the first resist 61 (FIG. 8A) in order to prevent the impurity doping with the first concentration while the first doping process (S11) is performed. The first resist 61 is, for example, a resist that covers the rectangular-shaped area shown by the dashed line 61' in FIGS. 5 and 9.

Accordingly, since the second semiconductor film 4a is covered by the first resist 61 (refer to FIG. 8A) while the first doping process (S11) is performed, the concentration or the type of the impurity material, or the area or the location of the second semiconductor film 4a constituting the discharge resistors 400 can be set regardless of the first semiconductor film 1a constituting the semiconductor elements.

Moreover, in the first forming process (S10), the second doping process (S12) can be performed so as to perform the impurity doping with the second concentration via the second resist 62 exposing a wider area than the area covered by the first resist 61 (refer to FIG. 8B) so that the portions consisting of the semiconductor layer that is more heavily impurity doped than the discharge resistors 400 locally exist at the connecting portions between the discharge resistors 400 and at least one of the image signal lines 91 and the counter electrode potential line 99. The second resist 62 is, for example, a resist having a rectangular opening shown by the dotted line in FIGS. 5 and 9.

By manufacturing as described above, the heavily impurity-doped portions 4d and 4e formed of the semiconductor layer that is more heavily impurity-doped than the discharge resistors 400 can be locally formed at the connecting portions of the discharge resistors 400. Accordingly, the loss of conductivity between the image signal lines 91 or the counter electrode potential lines 99 and the discharge resistor 400 caused by the existence of semiconductor film portions, at the connecting portions, having an excessively high resistance without impurity doping is effectively prevented. In case of performing the impurity doping, since such a semiconductor film portion with an excessively high resistance might be generated from, for example, a dimensional error of a mask or a pattern error, preparing locations of low resistances at connecting portions by using the first resist 61 and the second resist 62 whose patterns are delicately misaligned each other as described above, is especially advantageous in practice.

In the manufacturing method of the liquid crystal device according to the present embodiment, the routing wiring line 90 includes a wiring line portion passing the upper layer or the lower layer of the discharge resistors 400 via an interlayer insulating film on the TFT array substrate 10. The image signal lines 91 consist of a plurality of image signal lines 91a to 91f to which a plurality of serial-to-parallel expanded image signals VID1 to VID6 are supplied. Each of the plurality of image signal lines 91a to 91f is electrically connected to the ground potential line via a single discharge resistor corresponding thereto among the plurality of discharge resistors 400a to 400f as discharge resistors 400. Moreover, the length L and the width W of each of the plurality of discharge resistors 400a to 400f are arranged within a predetermined range, and the wiring line portion overlaps the entire plurality of discharge resistors 400a to 400f. The second doping process (S12) dopes the plurality of discharge resistors 400a to 400f in the same opportunity.

According to the manufacturing method of the liquid crystal device in the present embodiment, since the plurality of discharge resistors 400a to 400f are doped in the same opportunity by the second doping process (S12), the resistor length L and the resistor width W of each of the plurality of discharge resistors 400a to 400f can be arranged to the same design value. Accordingly, the wiring line portion passing the upper layer or the lower layer of the discharge resistors 400 via the interlayer insulating layer can be relatively easily overlapped equally with the entire plurality of discharge resistors 400a to 400f. The irregularities of the residual charges in each of the image signals VID1 to VID6 can be reduced. Accordingly, the liquid crystal layer 50 sandwiched between the pixel electrodes 9a and the counter electrodes 21 is effectively prevented from generating an image persistence with an unevenness by the application of DC voltage between both electrodes that has an unevenness triggered by an unevenness in the residual charges when, for example, it is removed from an inspection device. Therefore, it is possible to effectively prevent display irregularities generated in the image signals VID1 to VID6.

Electronic Apparatus

Next, various electronic apparatuses to which the liquid crystal device, which is an electro-optical device, is applied as described above will be described.

Figure 13:
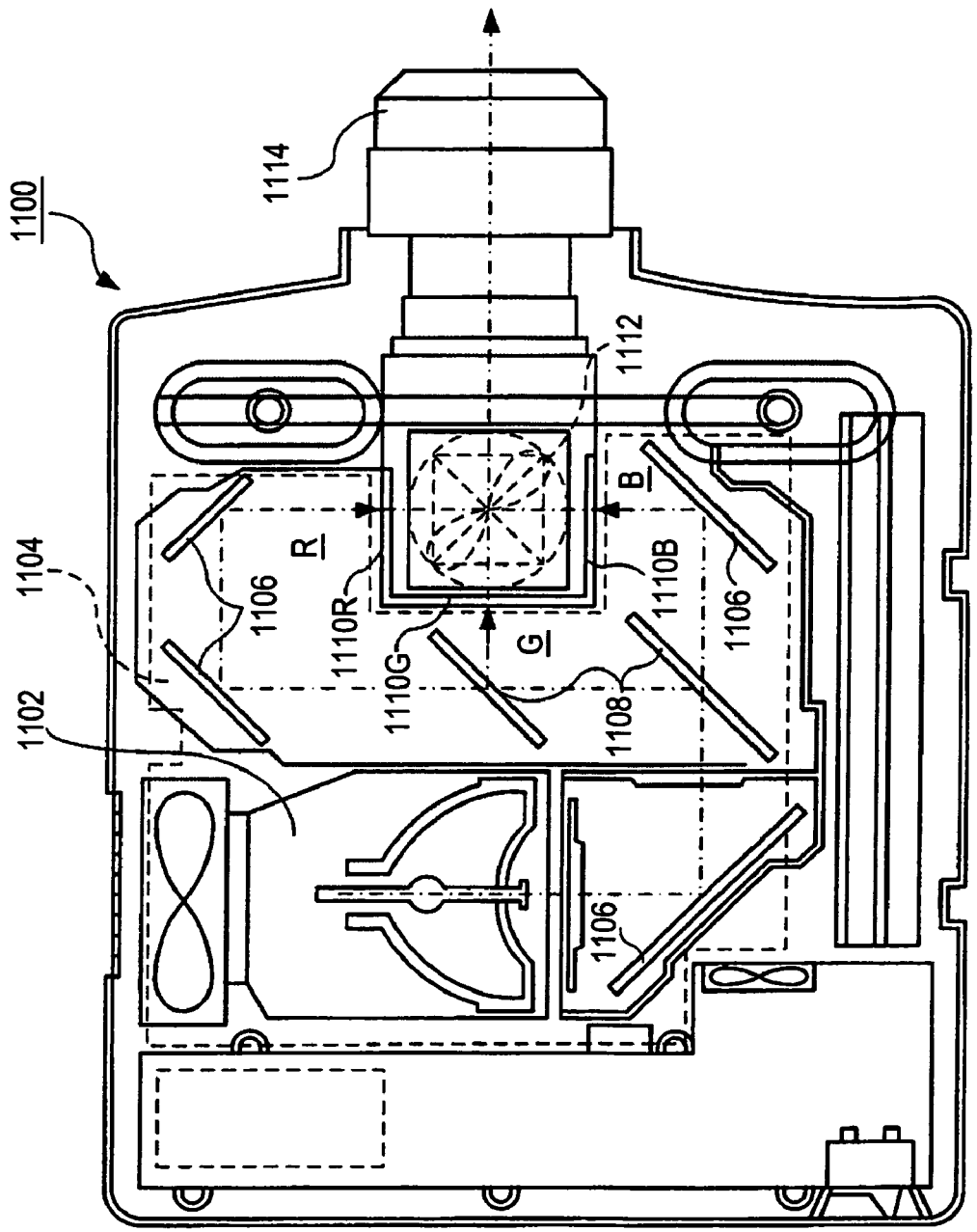
FIG. 13 is a plan view showing the structure of a projector which is an example of the electronic apparatus to which the electro-optical device is applied.

First, a projector that uses the liquid crystal device as a light bulb will be described. FIG. 13 is a plan view showing the construction example of the projector. As shown in FIG. 13, a lamp unit 1102 consisting of a white light source such as a halogen lamp is provided in the projector 1100. The projection light emitted from the lamp unit 1102 is divided into three primary color light components of R (red), G (green), and B (blue) by four mirrors 1106 and two dichroic mirrors 1108 placed in the light guide 1104, and the three primary color light components are introduced on the liquid crystal panels 1110R, 1110B, and 1110G as the light bulbs corresponding to the respective primary colors.

Each of the liquid crystal panels 1110R, 1110B, and 1110G has the same structure as the liquid crystal device described above, and is driven by the respective R, G, and B primary color signals supplied from the image signal processing circuit. The modulated light component by the respective liquid crystal panel is introduced to the dichroic prism 1112 from three directions. In the dichroic prism 1112, the R light component and B light component are diffracted by 90 degrees, whereas the G light component proceeds straight. Accordingly, as the result of synthesizing each color components of images, a color image is projected on the screen or the like, via the projection lens 1114.

Here, considering the display image by the respective liquid crystal panels 1110R, 1110B, and 1110G, the display image by the liquid crystal panel 1110G is needed to be left-flipped or right-flipped with respect to the display images by the liquid crystal panels 1110R and 1110B.

Also, since the light components corresponding to the respective primary colors of R, G, and B are introduced to the liquid crystal panels 1110R, 1110B and 1110G, color filter is not needed to be provided.

Figure 14:
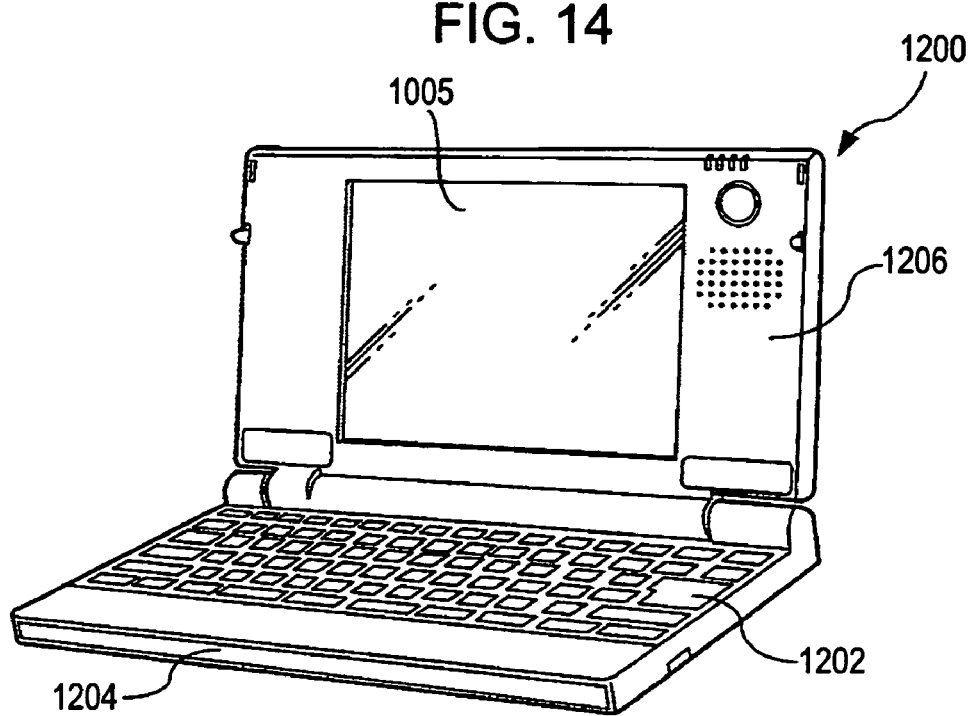
FIG. 14 is a perspective view showing the structure of a personal computer which is an example of the electronic apparatus to which the electro-optical device is applied.

Next, an example will be described where the liquid crystal device is applied to a mobile type personal computer. FIG. 14 is a perspective view showing the structure of the personal computer. In FIG. 14, the computer 1200 consists of a main body portion 1204 equipped with a keyboard 1202, and a liquid crystal display unit 1206. The liquid crystal display unit 1206 is formed by adding a back light to the back face of the liquid crystal device 1005 described above.

Figure 15:
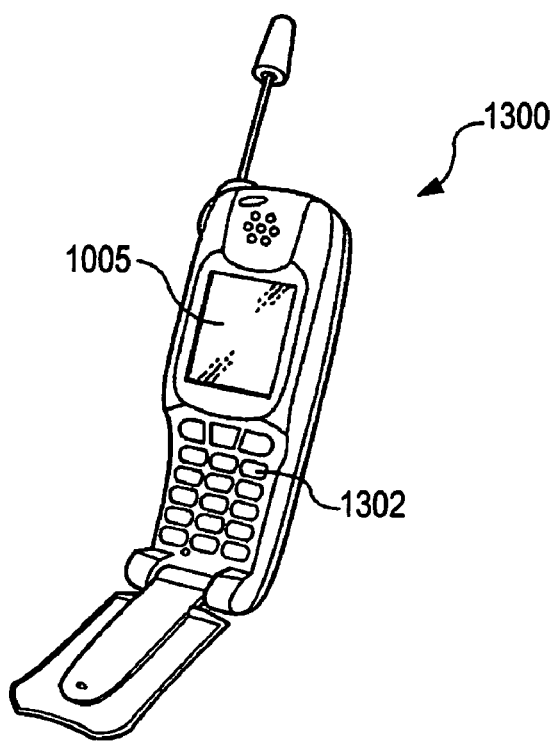
FIG. 15 is a perspective view showing the structure of a cellular phone which is an example of the electronic apparatus to which the electro-optical device is applied.

Moreover, an example will be described where the liquid crystal device is applied to a cellular phone. FIG. 15 is a perspective view showing the structure of the cellular phone. In FIG. 15, the cellular phone 1300 is equipped with a plurality of manipulation buttons 1302, and a reflective liquid crystal device 1005. The reflective liquid crystal device 1005 is, if necessary, equipped with a front light on its front face.

In addition to the electronic apparatus described with reference to FIGS. 13 to 15, the electronic apparatus can be an LCD television, a view finder type or monitor direct view type video tape recorder, a car navigation device, a pager, an electronic notebook, an electronic calculator, a word processor, a workstation, a videophone, a POS terminal, a device equipped with a touch panel, or the like. It is needless to mention that the liquid crystal device of the invention can be applied to these various electronic apparatus.

Third Embodiment

A third embodiment of the invention will be described with reference to FIGS. 16 and 17.

First, the electrical configuration of the electrostatic protection circuit and the discharge resistors of the electro-optical device according to the third embodiment will be described with reference to FIG. 16. Here, FIG. 16 is a circuit diagram showing the electrical configuration of the electrostatic protection circuit and the discharge resistors of the electro-optical device according to the third embodiment. In FIG. 16, same reference numerals are used for the same components as the components of the first embodiment shown in FIGS. 1 through 12, the description thereof being omitted.

As the electro-optical device according to the first embodiment shown with reference to FIG. 3, in the electro-optical device according to the second embodiment, one end of the image signal line 91 is electrically connected to an external circuit connection terminal 102 placed in the peripheral region, and the electrostatic protection circuit 410S is provided in the middle of the image signal line 91.

Figure 16:
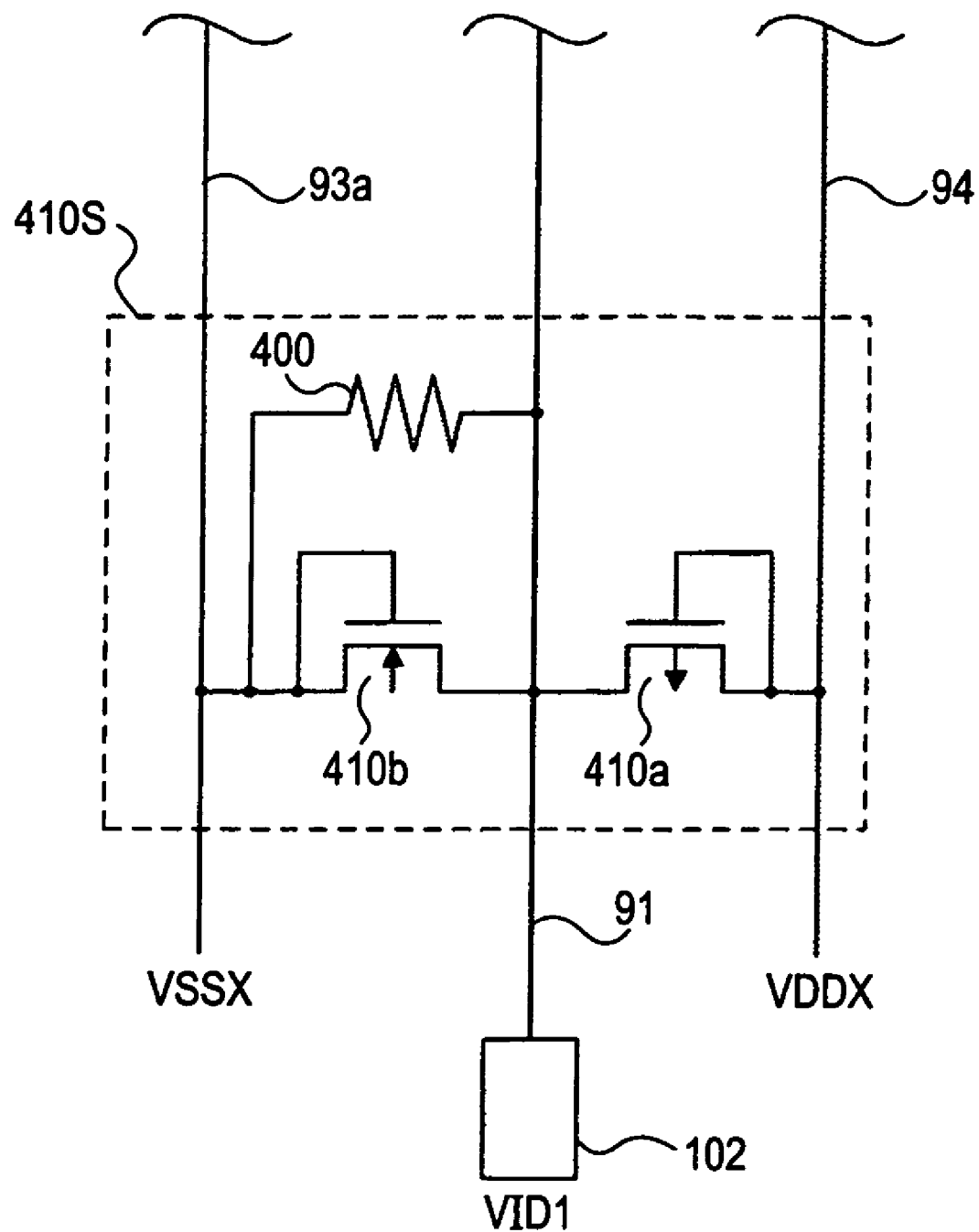
FIG. 16 is a circuit diagram showing the electrical configuration of the electrostatic protection circuit and the discharge resistors of the electro-optical device according to the second embodiment.

As shown in FIG. 16, the electrostatic protection circuit 410S is equipped with a P-channel TFT 410a and an N-channel TFT 410b. The gate of the P-channel TFT 410a is electrically connected to the power signal line 94 that supplies the first power signal VDDX. On the other hand, the gate of the N-channel TFT 410b is electrically connected to the ground potential line 93a that supplies the second power signal VSSX. Because of the diode-connection thus described, each of the P-channel TFT 410a and the N-channel TFT 410b functions as a diode. Accordingly, if static electricity is applied to the image signal line 91 via, for example, the external circuit connection terminal 102, the static electricity can be discharged rapidly via the P-channel TFT 410a at the location relatively close to the external circuit connection terminal 102 on the TFT array substrate 10. Accordingly, the electrostatic protection circuit 410S can protect the pixel switching TFT 30 from being destroyed by the electrostatic breakdown triggered by static electricity applied to the image signal lines 91 via, for example, the external circuit connection terminal 102. In FIG. 16, although the electrostatic protection circuit 410S is provided only in the middle of the image signal line 91 to supply the image signal VID1, the electrostatic protection circuit 410S having the same structure can be provided in the middle of each of the image signal line that supplies the respective image signals VID2 to VID6.

Moreover, as shown in FIG. 16, in the electro-optical device according to the third embodiment, the image signal line 91 is electrically connected to the ground potential line 93a in the electrostatic protection circuit 410S, in other words, at a location relatively close to the external circuit connection terminals 102 on the TFT array substrate 10. Accordingly, as in the electro-optical device according to the first embodiment, the image signal line 91 can be made free of the charges. Also, in the electro-optical device according to the third embodiment, different from the electro-optical device according to the first embodiment, the wiring rear end located at the opposite side of the front end connected to the external circuit protection terminal 102 of the image signal line 91 is not needed to be electrically connected to the ground potential line 93a via the discharge resistor 400 (refer to FIG. 3). The wiring rear end located at the opposite side as described above may also be equipped with the discharge resistor 400 redundantly (refer to FIG. 3).

In the third embodiment, in particular, since the discharge resistor 400 is provided within the electrostatic protection circuit 410S (more specifically, when viewed from the external circuit connection terminal 102, the image signal line 91 is electrically connected to the discharge resistor 400 at a location farther than the electrostatic protection circuit 410S), the possibility that the discharge resistor 400 is destroyed by the electrostatic breakdown due to the existence of static electricity applied to the image signal lines 91 becomes dramatically low.

Next, the specific structure of the electrostatic protection circuit and the discharge resistor described above will be described with reference to FIG. 17. Here, FIG. 17 is a plan view showing the specific structure of the electrostatic protection circuit and the discharge resistor of the electro-optical device according to the third embodiment.

Figure 17:
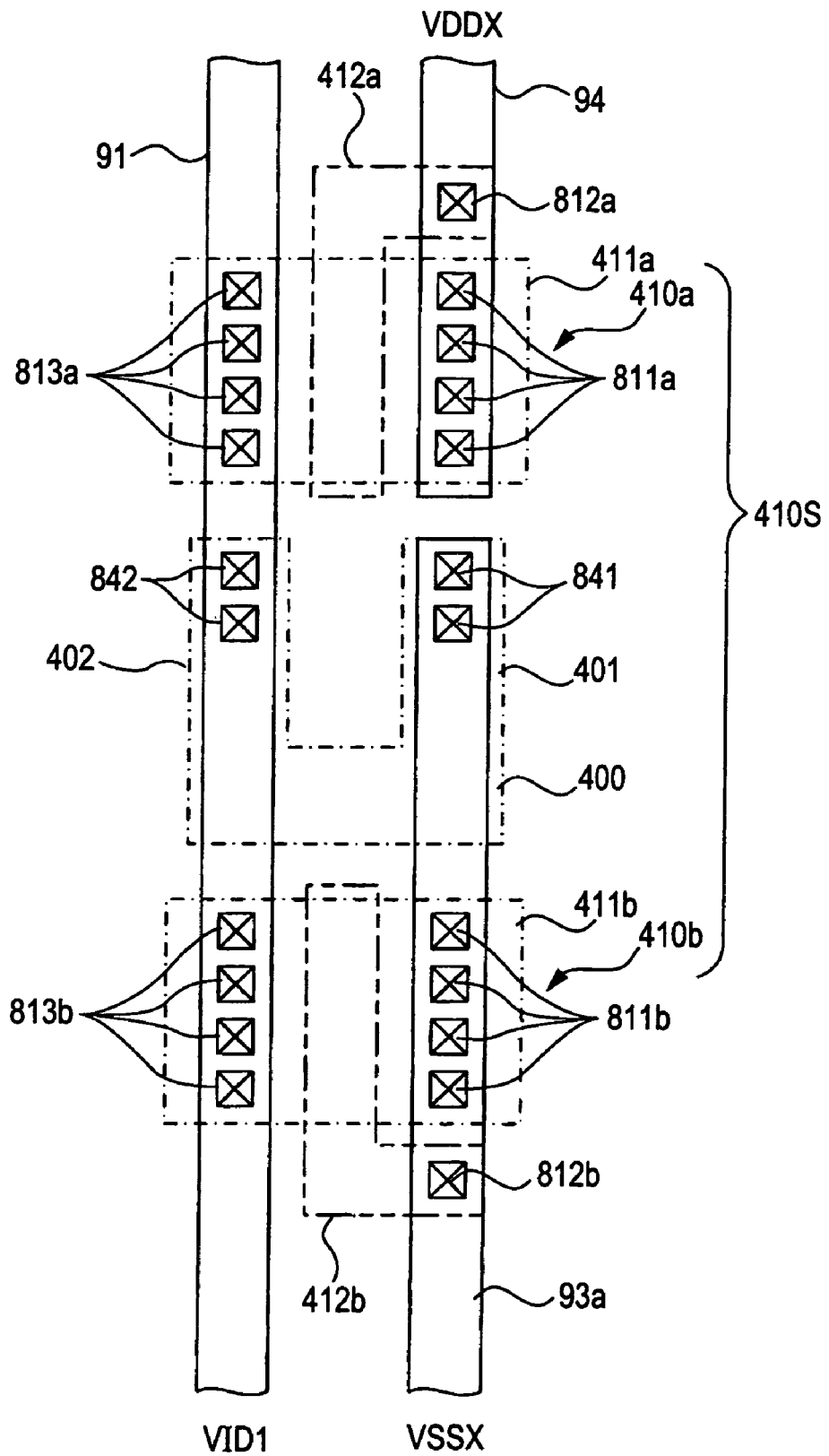
FIG. 17 is a plan view showing the specific structure of the electrostatic protection circuit and the discharge resistors of the electro-optical device according to the second embodiment.

As shown in FIG. 17, the electrostatic protection circuit 410S is equipped with a P-channel TFT 410a and an N-channel TFT 410b.

The P-channel TFT 410a consists of a semiconductor layer 411a and the gate electrode 412a.

The gate electrode 412a is formed of the same film as the scanning line 2 (refer to FIG. 4), and is electrically connected to the power signal line 94 formed of the same film as the lower capacity electrode 71 (refer to FIG. 4) via the contact hole 812a. It is noted that the "same film" herein means the film formed in the same opportunity in the manufacturing process, and thus is the same type, and "being the same film" herein does not necessarily mean that they are formed as a single continuous layer. Basically, the film portions divided from one another in the same film are enough in that effect.

The semiconductor layer 411a is formed of the same film as the semiconductor layer 1a (refer to FIG. 4). The source region of the semiconductor layer 411a is electrically connected to the power signal line 94 via the contact hole 811a.

On the other hand, the drain region of the semiconductor layer 411a is electrically connected to the image signal line 91 via the contact hole 813a.

The N-channel TFT 410b consists of the semiconductor layer 411b and the gate electrode 412b.

The gate electrode 412b is formed of the same film as the scanning line 2, and is electrically connected to the power signal line 94 via the contact hole 812b.

The semiconductor layer 411b is formed of the same film as the semiconductor layer 1a. The source region of the semiconductor layer 411b is electrically connected to the ground potential line 93a via the contact hole 811b. On the other hand, the drain region of the semiconductor layer 411b is electrically connected to the image signal line 91 via the contact hole 813b.

In FIG. 17, the discharge resistor 400 is provided in the electrostatic protection circuit 410S. The discharge resistor 400 has a roughly similar structure to the discharge resistors in the first embodiment described with reference to FIG. 6. The discharge resistor 400 is electrically connected to the ground potential line 93a via the contact hole 841, and is electrically connected to the image signal line 91 via the contact hole 842. Since the discharge resistor 400 is thus fabricated in the electrostatic protection circuit 410S, the TFT array substrate 10 or the overall electro-optical device is not needed to become large.

Moreover, in the present embodiment, the discharge resistor 400 is constituted to have the first portion 401 along the ground potential line 93a and the second portion 402 along the image signal line 91. Therefore, compared with the case when the discharge resistor 400 is formed solely of the portion connecting the ground potential line 93a linearly to the image signal line 91 and thus the first portion 401 and the second portion 402 do not exist, the discharge resistor 400 can be fabricated with higher resistance. In other words, by elongating the first portion 401 along the ground potential line 93a, or in addition to or instead of this, by elongating the second portion 402 along the image signal line 91, the distance between the contact holes 841 and 842 can be extended, and thus can raise the value of resistance of the discharge resistor 400 in proportion to the distance. In such a case, the wiring pitch of the plurality of wiring lines arranged in a stripe shape including the ground potential line 93a and the image signal line 91 is not needed to be widened in order to raise the value of resistance of the discharge resistors 400. The above-mentioned feature is especially advantageous in practice in pursuing the miniaturization of the wiring lines in the wiring region that is limited on the TFT array substrate 10 and, at the same time, raising the value of resistance of the discharge resistor 400.

As described above, according to the electro-optical device of the third embodiment, since the electrostatic protection circuit 410S exists between the portion where the image signal line 91 is connected to the discharge resistor 400 and the external circuit connection terminal 102, even when small-sized discharge resistor 400 is fabricated, the possibility that the small-sized discharge resistor 400 is destroyed by the electrostatic breakdown due to the existence of static electricity becomes dramatically low. Fabricating the discharge resistors 400 in the electrostatic protection circuit 410S thus prevents the device from being deteriorated by the electrostatic breakdown without making the TFT array substrate 10 or the overall electro-optical device large.

The invention is not limited to the above-mentioned embodiments, but it can be suitably modified within a range without departing from a subject matter or spirit of the invention read on the appended claims and the specification. An electro-optical device accompanied by such modification and the electronic apparatus equipped with the electro-optical device will be also fallen within a technical range of the invention.

What is claimed is:

1. An electro-optical device comprising, on a substrate:
   a plurality of pixel portions arranged in a pixel region;
   a peripheral circuit in a peripheral region located at a periphery of the pixel region that controls the plurality of pixel portions;
   an image signal line that supplies an image signal;
   a ground potential line that supplies a ground potential to the peripheral circuit; and
   a discharge resistor electrically connecting the image signal line and the ground potential line, the image signal line extending from the discharge resistor,
   the discharge resistor being made of a semiconductor film having a higher resistance than a conductive film comprising the image signal line and the ground potential line,
   wherein an impurity material that is doped on the semiconductor film comprises semiconductor elements that comprise at least a part of the pixel portions or the peripheral circuit, and a different impurity material is doped on the semiconductor film comprising the discharge resistor.

2. The electro-optical device according to claim 1, further comprising:
   counter electrodes opposing the pixel portions; and
   a counter electrode potential line that supplies counter electrode potential to the counter electrodes,
   wherein the pixel portions have pixel electrodes.

3. The electro-optical device according to claim 2,
   the counter electrode potential line being electrically connected to the ground potential line via the discharge resistor.

4. The electro-optical device according to claim 3,
   one end of the image signal line and/or the counter electrode potential line being electrically connected to each of external circuit connection terminals placed at the peripheral region, and an other end of the image signal line and/or the counter electrode potential line being electrically connected to the ground potential line via the discharge resistor.

5. The electro-optical device according to claim 2,
   end of the image signal line and the counter electrode potential line being electrically connected to each of external circuit connection terminals placed at the peripheral region;
   an electrostatic protection circuit and/or an input protection circuit being provided in a middle of the image signal line and the counter electrode potential line; and
   each of the image signal line and the counter electrode potential line being electrically connected to the ground potential line via the discharge resistor in the electrostatic protection circuit and/or the input protection circuit.

6. The electro-optical device according to claim 2,
   one end of the image signal line and the counter electrode potential line being electrically connected to each of external circuit connection terminals placed at the peripheral region;
   an electrostatic protection circuit and/or an input protection circuit being provided in a middle of image signal line and the counter electrode potential line; and
   each of the image signal line and the counter electrode potential line being electrically connected to the ground potential line via the discharge resistor, on a side farther than the electrostatic protection circuit and/or the input protection circuit from the external circuit connection terminals.

7. The electro-optical device according to claim 2, the counter electrode potential line and the image signal line being electrically connected to a same ground potential line via the discharge resistor.

8. The electro-optical device according to claim 1, further comprising wiring lines on the substrate including a wiring line portion passing an upper layer or a lower layer of the discharge resistor via an interlayer insulating film.

9. The electro-optical device according to claim 8, the image signal line being made of a plurality of image signal lines to which a plurality of serial-to-parallel expanded image signals are supplied;

each of the plurality of image signal lines being electrically connected to the ground potential line via the discharge resistor;

a length and a width of the discharge resistor falling within a predetermined range; and the wiring line portion overlapping the discharge resistor.

10. An electronic apparatus that is equipped with the electro-optical device according to claim 1.

11. The electro-optical device according to claim 1, wherein the discharge resistor includes a first portion and a second portion, a plurality of configurable spaced contacts are disposed in the first portion and the second portion.

12. An electro-optical device comprising, on a substrate:

a plurality of pixel portions arranged in a pixel region;

a peripheral circuit in a peripheral region located at a periphery of the pixel region that controls the plurality of pixel portions;

an image signal line that supplies an image signal;

a ground potential line that supplies a ground potential to the peripheral circuit; and a discharge resistor electrically connecting the image signal line and the ground potential line, the image signal line extending from the discharge resistor, the discharge resistor being made of an impurity-doped semiconductor film having a higher resistance than a conductive film comprising the image signal line and the ground potential line; and wherein a portion of the semiconductor film that is doped by a heavier impurity than that of the discharge resistor is locally formed at a connecting portion of the discharge resistor and at least one of the image signal line and the counter electrode potential line.

13. A method of manufacturing an electro-optical device comprising:

a plurality of pixel portions arranged in a pixel region;

a peripheral circuit in a peripheral region located at a periphery of the pixel region that controls the plurality of pixel portions;

an image signal line that supplies an image signal;

a ground potential line that supplies a ground potential to the peripheral circuit; and a discharge resistor electrically connecting the image signal line and the ground potential line, the image signal line extending from the discharge resistor, the discharge resistor including a first portion along the ground potential line and a second portion along the image signal line in planar view, the first portion overlapping the ground potential line and the second portion overlapping the image signal line, the discharge resistor being made of a film having a higher resistance than a conductive film that comprises the image signal line and the ground potential line, the method comprising:

forming the pixel portions, the peripheral circuit, external circuit connection terminals, wiring lines, and the discharge resistor, on a substrate;

forming counter electrodes on a counter substrate; and bonding the substrate and the counter substrate to each other;

wherein the forming of the pixel portions, the peripheral circuit, the external circuit connection terminals, the wiring lines, and the discharge resistor on the substrate comprises:

doping a first semiconductor film comprising semiconductor elements that constitute at least a part of the pixel portions or the peripheral circuit by using an impurity with a first concentration, and doping a second semiconductor film comprising the discharge resistor by using an impurity with a second concentration, which is performed separately from the doping of the first semiconductor film.

14. The method of manufacturing the electro-optical device according to claim 13, wherein in the forming of the pixel regions, the peripheral circuit, the external circuit connection terminals, the wiring lines, and the discharge resistors on the substrate, the first semiconductor film and the second semiconductor film are formed and patterned by a same process before the doping of the first semiconductor film and the doping of the second semiconductor film.

15. The method of manufacturing the electro-optical device according to claim 13, wherein in the forming of the pixel region, the peripheral circuit, the external circuit connection terminals, the wiring lines, and the discharge resistors on the substrate, during the forming of the first semiconductor film, the second semiconductor film is covered by a first resist for preventing doping by the impurity with the first concentration.

16. The method of manufacturing the electro-optical device according to claim 15, wherein in the forming of the pixel region, the peripheral circuit, the external circuit connection terminals, the wiring lines, and the discharge resistors on the substrate, the doping of the second semiconductor film is performed so as to dope the impurity with the second concentration by using a second resist in which a wider area than an area covered by the first resist is exposed so that a portion made of the semiconductor film that is doped by a heavier impurity than that of the discharge resistors is locally formed at a connecting portion of the discharge resistors and at least one of the image signal line and potential lines of the counter electrodes.

17. The method of manufacturing the electro-optical device according to claim 13, wherein the wiring lines include a wiring line portion passing an upper layer or a lower layer of the discharge resistors via an interlayer insulating layer on the substrate, the image signal line having a plurality of image signal lines to which a plurality of serial-to-parallel expanded image signals are supplied, each of the plurality of image signal lines being electrically connected to the ground potential line via the discharge resistor, a length and a width of the discharge resistor being within a predetermined range, and the wiring line portion overlapping the discharge resistor, and wherein doping the second semiconductor film comprises doping the discharge resistor by a same process.

* * * * *